United States Patent
Namba et al.

(10) Patent No.: US 8,586,169 B2
(45) Date of Patent: Nov. 19, 2013

(54) THERMAL BARRIER COATING MEMBER, METHOD FOR PRODUCING THE SAME, THERMAL BARRIER COATING MATERIAL, GAS TURBINE, AND SINTERED BODY

(75) Inventors: Katsumi Namba, Hyogo (JP); Taiji Torigoe, Hyogo (JP); Ikuo Okada, Hyogo (JP); Kazutaka Mori, Hyogo (JP); Ichiro Nagano, Hyogo (JP); Yutaka Kawata, Hyogo (JP); Koji Takahashi, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 562 days.

(21) Appl. No.: 12/225,490

(22) PCT Filed: Oct. 6, 2006

(86) PCT No.: PCT/JP2006/320067
§ 371 (c)(1),
(2), (4) Date: Sep. 23, 2008

(87) PCT Pub. No.: WO2007/116547
PCT Pub. Date: Oct. 18, 2007

(65) Prior Publication Data
US 2009/0176059 A1   Jul. 9, 2009

(30) Foreign Application Priority Data
Mar. 31, 2006   (JP) .................. 2006-096946

(51) Int. Cl.
*B32B 15/00* (2006.01)
*C09D 1/00* (2006.01)
*B05D 1/36* (2006.01)
*B05D 5/00* (2006.01)
*C23C 14/34* (2006.01)

(52) U.S. Cl.
USPC ........ 428/155; 428/319.1; 428/457; 428/471; 106/286.2; 204/192.11; 427/402; 427/243; 427/261; 416/241 R; 416/241 B

(58) Field of Classification Search
None
See application file for complete search history.

(56) References Cited

U.S. PATENT DOCUMENTS 6,117,560 A   9/2000   Maloney
6,177,200 B1   1/2001   Maloney
(Continued)

FOREIGN PATENT DOCUMENTS

CN   1657573 A   8/2005
EP   1 400 610 A1   3/2004
(Continued)

OTHER PUBLICATIONS

New Increased Temperature Capability Thermal Barrier Coatings. Final Report Contract G4RD-CT-2001-00504. Jul. 31, 2006. 65p.*
(Continued)

*Primary Examiner* — Vera Katz
(74) *Attorney, Agent, or Firm* — Westerman, Hattori, Daniels & Adrian, LLP

(57) ABSTRACT

There are provided a thermal barrier coating material and a thermal barrier coating member that can suppress spalling when used at a high temperature and have a high thermal barrier effect, a method for producing the same, a turbine member coated with a thermal barrier coating, and a gas turbine. The thermal barrier coating member comprises a heat resistant substrate, a bond coat layer formed thereon, and a ceramic layer formed further thereon, wherein the ceramic layer comprises an oxide which consists of an oxide represented by the general formula $A_2Zr_2O_7$ doped with a predetermined amount of CaO or MgO and has 10 volume % or more of a pyrochlore type crystal structure, where A represents any of La, Nd, Sm, Gd, and Dy.

8 Claims, 8 Drawing Sheets

(56) References Cited

U.S. PATENT DOCUMENTS

| | | | |
|---|---|---|---|
| 6,258,467 B1 | 7/2001 | Subramanian | |
| 6,319,614 B1 | 11/2001 | Beele | |
| 7,514,387 B2* | 4/2009 | LaBarge | 502/439 |
| 7,859,100 B2* | 12/2010 | Torigoe et al. | 257/703 |
| 8,034,468 B2 | 10/2011 | Hayashi | |
| 2003/0148140 A1* | 8/2003 | Oguma et al. | 428/629 |
| 2004/0101699 A1 | 5/2004 | Vassen et al. | |
| 2004/0102309 A1 | 5/2004 | Gadow et al. | |
| 2005/0142392 A1 | 6/2005 | Spitsberg et al. | |
| 2006/0073979 A1* | 4/2006 | Thieme et al. | 505/434 |
| 2006/0151856 A1* | 7/2006 | Torigoe et al. | 257/632 |
| 2006/0179717 A1* | 8/2006 | LaBarge | 48/127.9 |
| 2007/0111893 A1* | 5/2007 | Kodenkandath et al. | 505/210 |
| 2007/0179063 A1* | 8/2007 | Malozemoff et al. | 505/329 |
| 2007/0224443 A1* | 9/2007 | Torigoe et al. | 428/632 |
| 2008/0233406 A1 | 9/2008 | Hayashi | |
| 2009/0081456 A1* | 3/2009 | Goyal | 428/389 |
| 2010/0196615 A1* | 8/2010 | Torigoe et al. | 427/456 |

FOREIGN PATENT DOCUMENTS

| | | |
|---|---|---|
| EP | 1 473 378 A1 | 11/2004 |
| JP | 58-087273 A | 5/1983 |
| JP | 10-212108 A | 8/1998 |
| JP | 2000-119870 A | 4/2000 |
| JP | 2001-505620 A | 4/2001 |
| JP | 2001-348655 A | 12/2001 |
| JP | 2002-504627 A | 2/2002 |
| JP | 2003-160852 A | 6/2003 |
| JP | 2003-524075 A | 8/2003 |
| JP | 2003-342751 A | 12/2003 |
| JP | 2004-149915 A | 5/2004 |
| JP | 2004-179642 A | 6/2004 |
| JP | 2004-332095 A | 11/2004 |
| JP | 2004-332113 A | 11/2004 |
| JP | 2005-501174 A | 1/2005 |
| JP | 2005-231951 * | 2/2005 |
| JP | 2005-163185 A | 6/2005 |
| JP | 2005-206450 A | 8/2005 |
| JP | 2005-231951 A | 9/2005 |
| JP | 2005-325418 A | 11/2005 |
| JP | 5029365 B2 | 9/2012 |
| WO | 03/011782 A2 | 2/2003 |
| WO | 2005/019784 A1 | 3/2005 |

OTHER PUBLICATIONS

Yamamura et al. Solid state Ionics, 158, 2003, p. 359-365.*
International Search Report of PCT/JP2006/320067, date of mailing Jan. 16, 2007.
Chinese Office Action dated Mar. 10, 2010, issued in corresponding Chinese Patent Application No. 200680054022.X.
Omata, Takahisa et al.; "Proton solubility for La2Zr2O7 with a pyrochlore structure doped with a series of alkaline-earth ions"; Solid State Ionics, vol. 167, (2004), pp. 389-397.
Chinese Office Action dated Oct. 29, 2010, issued in corresponding Chinese Patent Application No. 200680054022.X.
European Search Report dated Dec. 9, 2010, issued in corresponding European Patent Application No. 06811394.3.
Wilde, P. J. et al.; "Molecular dynamics study of the effect of doping and disorder on diffusion in gadolinium zirconate"; Solid State Ionics, North Holland Pub. Company. Amsterdam; NL, NL, vol. 112, No. 3-4, Oct. 1, 1998, pp. 185-195.
Omata, Takahisa et al.; "Proton solubility for La2Zr2O7 with a pyrochlore structure doped with a series of alkaline-earth ions"; Solid State Ionics, North Holland Pub. Company. Amsterdam; NL, NL, vol. 167, No. 3-4, Feb. 27, 2004, pp. 389-397.
Qiang, Xu et al.; "Preparation and thermophysical properties of Dy2Zr2O7 ceramic for thermal barrier coatings"; Materials Letters, North Holland Publishing Company. Amsterdam, NL, vol. 59, No. 22, Sep. 1, 2005, pp. 2804-2807.
Japanese Office Action dated May 10, 2011, issued in corresponding Japanese Patent Application No. 2006-096946.
Japanese Office Action dated Apr. 2, 2013, issued in corresponding Japanese Patent Application No. 2010-160678, w/ English translation.
Japanese Office Action dated Apr. 2, 2013, issued in corresponding Japanese Patent Application No. 2010-160679, w/ English translation.
Decision to Grant a Patent dated Jun. 18, 2013, issued in corresponding Japanese Patent Application No. 2010-160678 (3 pages).

* cited by examiner

THERMAL BARRIER COATING MEMBER, METHOD FOR PRODUCING THE SAME, THERMAL BARRIER COATING MATERIAL, GAS TURBINE, AND SINTERED BODY

TECHNICAL FIELD

The present invention relates to a thermal barrier coating material, a thermal barrier coating member, a gas turbine, and a sintered body which have excellent durability, and the production of the thermal barrier coating member, particularly to the structure of a ceramic layer used as a top coat of the thermal barrier coating member.

BACKGROUND ART

In recent years, the elevation of the thermal efficiency of thermal power generation has been examined as one of energy saving measures. In order to improve the power generation efficiency of a generator gas turbine, the elevation of the gas inlet temperature is effective, and in some cases, the temperature is elevated to about 1500° C. In order to realize the temperature elevation in power generators in this way, a stationary blade, a moving blade, the wall material of a combustor, or the like which constitute the gas turbine are required to be constituted with heat resistant members. However, although the material of the turbine blades is a refractory metal, it cannot endure such a high temperature. Therefore, a thermal barrier coating (TBC), a laminate of ceramic layers composed of oxide ceramics, is formed on the refractory-metal substrate through a metal bonding layer by a film-forming method such as thermal spraying, so as to protect from high temperatures. As the ceramic layer, a $ZrO_2$-based material, especially a YSZ (yttria-stabilized zirconia) which is $ZrO_2$ partially or completely stabilized by $Y_2O_3$, is often used because it has a relatively low thermal conductivity and a relatively high coefficient of thermal expansion, among ceramic materials.

However, it is considered that, if the moving blade, the stationary blade, and the like of a gas turbine are coated with the abovementioned thermal barrier coating comprising the ceramic layers composed of YSZ, the inlet temperature of the turbine can be elevated to a temperature higher than 1500° C. depending on the type of the gas turbine. When the gas turbine is operated at such a high temperature, there has been a concern in which a part of the ceramic layer is spalled away and its heat resistance is impaired during the operation of the gas turbine under severe operating conditions. Moreover, in recent years, it is considered in view of higher efficiency that the inlet temperature of the turbine reaches as high as 1700° C. so that the surface temperature of turbine blades elevates to as high as 1300° C. Therefore, the situation is such that further higher heat resistance has been required for the thermal barrier coating of turbine blades.

The above-described problem of the spalling of the ceramic layer composed of YSZ is caused by that the stability of YSZ crystals is insufficient in a high-temperature environment, and the YSZ crystals do not have sufficient durability against a large thermal stress. That is to say, when thermal cycles involved in the start and shutdown of the turbine are applied, a ceramic layer having a lower coefficient of thermal expansion as compared to a heat resistant substrate and a bond coat layer may be spalled away because of a stress or the like due to the difference in the coefficient of thermal expansion from the heat resistant substrate and the bond coat layer (hereunder, the durability against such an action due to thermal cycles is referred to as "thermal cycle durability"). In order to solve this problem, a thermal barrier coating member using a zirconia layer stabilized by $Yb_2O_3$, or a zirconia layer $ZrO_2$ stabilized by $Yb_2O_3$ and $Er_2O_3$ has been proposed in Patent Document 1.

Patent Document 1:
Japanese Unexamined Patent Application, Publication No. 2003-160852.

DISCLOSURE OF INVENTION

The present invention provides a thermal barrier coating material, a thermal barrier coating member, and a gas turbine that can suppress the spalling when used at a high temperature and have a high thermal barrier effect, and a method for producing the thermal barrier coating member having the above properties. Moreover, the present invention provides a sintered body having high durability and thermal barrier effect.

The present invention provides a thermal barrier coating material comprising an oxide which consists of an oxide represented by the general formula $A_2Zr_2O_7$ (where A represents any of La, Nd, Sm, Gd, and Dy) doped with at least either one of CaO in an amount not smaller than 5 mol % and not larger than 30 mol % and MgO in an amount not smaller than 5 mol % and not larger than 30 mol %, and having 10 volume % or more of a pyrochlore type crystal structure.

The present invention also provides a thermal barrier coating material comprising an oxide represented by the general formula $A'_1B_1Zr_2O_7$ (where A' and B each represent any of La, Nd, Sm, Gd, Dy, Ce, and Yb, and A' and B are mutually different elements). The oxide preferably has a pyrochlore type crystal structure to lower the thermal conductivity.

The present invention also provides a thermal barrier coating material comprising an oxide represented by the general formula $A''_2Ce_2O_7$ (where A'' represents any of La, Sm, and Yb). The oxide preferably has a pyrochlore type crystal structure to lower the thermal conductivity.

Any of the abovementioned thermal barrier coating materials may be a material to be thermal-sprayed or deposed on a heat resistant substrate, and the heat resistant substrate may be a substrate to be used for parts of gas turbines.

The present invention also provides a thermal barrier coating member comprising a heat resistant substrate, a bond coat layer formed on the heat resistant substrate, and a ceramic layer formed on the bond coat layer, wherein the ceramic layer comprises an oxide which consists of an oxide represented by the general formula $A_2Zr_2O_7$ (where A represents any of La, Nd, Sm, Gd, and Dy) doped with at least either one of CaO in an amount not smaller than 5 mol % and not larger than 30 mol % and MgO in an amount not smaller than 5 mol % and not larger than 30 mol %, and the ceramic layer has 10 volume % or more of a pyrochlore type crystal structure.

The present invention also provides a thermal barrier coating member comprising a heat resistant substrate, a bond coat layer formed on the heat resistant substrate, and a ceramic layer formed on the bond coat layer, wherein the ceramic layer comprises an oxide represented by the general formula $A'_1B_1Zr_2O_7$ (where A' and B each represent any of La, Nd, Sm, Gd, Dy, Ce, and Yb, and A' and B are mutually different elements). The oxide preferably has a pyrochlore type crystal structure to lower the thermal conductivity.

The present invention also provides a thermal barrier coating member comprising a heat resistant substrate, a bond coat layer formed on the heat resistant substrate, and a ceramic layer formed on the bond coat layer, wherein the ceramic layer comprises an oxide represented by the general formula $A''_2Ce_2O_7$ (where A'' represents any of La, Sm, and Yb). The oxide preferably has a pyrochlore type crystal structure to lower the thermal conductivity.

In any of the abovementioned thermal barrier coating members, the ceramic layer desirably has pores at a porosity of not lower than 1% and not higher than 30%.

Alternatively, in any of the abovementioned thermal barrier coating members, the ceramic layer desirably has vertical cracks in a thickness direction thereof at intervals of not smaller than 5% and not larger than 100% of a total thickness of layer(s) other than the bond coat layer on the heat resistant substrate.

Alternatively, in any of the abovementioned thermal barrier coating members, the ceramic layer is desirably of columnar crystals.

Moreover, in any of the abovementioned thermal barrier coating members, desirably, a zirconia-containing layer is further provided between the bond coat layer and the ceramic layer, and the zirconia-containing layer has pores at a porosity of not lower than 1% and not higher than 30%.

Alternatively, in any of the abovementioned thermal barrier coating members, desirably, a zirconia-containing layer is further provided between the bond coat layer and the ceramic layer, and the zirconia-containing layer has vertical cracks in a thickness direction thereof at intervals of not smaller than 5% and not larger than 100% of a total thickness of layer(s) other than the bond coat layer on the heat resistant substrate.

The present invention also provides a gas turbine comprising any of the abovementioned thermal barrier coating members.

The present invention also provides a sintered body comprising an oxide which consists of an oxide represented by the general formula $A_2Zr_2O_7$ (where A represents any of La, Nd, Sm, Gd, and Dy) doped with at least either one of CaO in an amount not smaller than 5 mol % and not larger than 30 mol % and MgO in an amount not smaller than 5 mol % and not larger than 30 mol %, and having 10 volume % or more of a pyrochlore type crystal structure.

The present invention also provides a sintered body comprising an oxide represented by the general formula $A'_1B_1Zr_2O_7$ (where A' and B each represent any of La, Nd, Sm, Gd, Dy, Ce, and Yb, and A' and B are mutually different elements). The oxide preferably has a pyrochlore type crystal structure to lower the thermal conductivity.

The present invention also provides a sintered body comprising an oxide represented by the general formula $A''_2Ce_2O_7$ (where A'' represents any of La, Sm, and Yb). The oxide preferably has a pyrochlore type crystal structure to lower the thermal conductivity.

The present invention also provides a method for producing a thermal barrier coating member comprising: a step of forming a bond coat layer on a heat resistant substrate; and a step of forming a ceramic layer comprising an oxide which consists of an oxide represented by the general formula $A_2Zr_2O_7$ (where A represents any of La, Nd, Sm, Gd, and Dy) doped with at least either one of CaO in an amount not smaller than 5 mol % and not larger than 30 mol % and MgO in an amount not smaller than 5 mol % and not larger than 30 mol %, and having 10 volume % or more of a pyrochlore type crystal structure, on the bond coat layer.

The present invention also provides a method for producing a thermal barrier coating member comprising: a step of forming a bond coat layer on a heat resistant substrate; and a step of forming a ceramic layer comprising an oxide represented by the general formula $A'_1B_1Zr_2O_7$ (where A' and B each represent any of La, Nd, Sm, Gd, Dy, Ce, and Yb, and A' and B are mutually different elements), on the bond coat layer. The oxide preferably has a pyrochlore type crystal structure to lower the thermal conductivity.

The present invention also provides a method for producing a thermal barrier coating member comprising: a step of forming a bond coat layer on a heat resistant substrate; and a step of forming a ceramic layer comprising an oxide represented by the general formula $A''_2Ce_2O_7$ (where A'' represents any of La, Sm, and Yb), on the bond coat layer. The oxide preferably has a pyrochlore type crystal structure to lower the thermal conductivity.

In any of the abovementioned methods for producing a thermal barrier coating member, a step of forming a zirconia-containing layer may be provided between the bond coat layer formation step and the ceramic layer formation step.

The zirconia-containing layer formation step may include a stage of introducing pores into the zirconia-containing layer.

Alternatively, the zirconia-containing layer formation step may include a stage of introducing vertical cracks into the zirconia-containing layer in a thickness direction.

Moreover, in any of the abovementioned methods for producing a thermal barrier coating member, the ceramic layer formation step may include a stage of introducing pores into the ceramic layer.

Alternatively, in any of the abovementioned methods for producing a thermal barrier coating member, the ceramic layer formation step may include a stage of introducing vertical cracks into the ceramic layer in a thickness direction.

The present invention also provides a method for producing a thermal barrier coating member comprising: a step of forming a bond coat layer on a heat resistant substrate; and a step of forming a ceramic layer which has columnar crystals comprising an oxide which consists of an oxide represented by the general formula $A_2Zr_2O_7$ (where A represents any of La, Nd, Sm, Gd, and Dy) doped with at least either one of CaO in an amount not smaller than 5 mol % and not larger than 30 mol % and MgO in an amount not smaller than 5 mol % and not larger than 30 mol %, and having 10 volume % or more of a pyrochlore type crystal structure, on the bond coat layer, with use of an electron-beam physical vapor deposition method.

The present invention also provides a method for producing a thermal barrier coating member comprising: a step of forming a bond coat layer on a heat resistant substrate; and a step of forming a ceramic layer which has columnar crystals comprising an oxide represented by the general formula $A'_1B_1Zr_2O_7$ (where A' and B each represent any of La, Nd, Sm, Gd, and Dy, B represents either one of Ce and Yb, and A' and B are mutually different elements), on the bond coat layer, with use of an electron-beam physical vapor deposition method. The oxide preferably has a pyrochlore type crystal structure to lower the thermal conductivity.

The present invention also provides a method for producing a thermal barrier coating member comprising: a step of forming a bond coat layer on a heat resistant substrate; and a step of forming a ceramic layer which has columnar crystals comprising an oxide represented by the general formula $A''_2Ce_2O_7$ (where A'' represents any of La, Sm, and Yb), on the bond coat layer, with use of an electron-beam physical vapor deposition method. The oxide preferably has a pyrochlore type crystal structure to lower the thermal conductivity.

According to the present invention, a thermal barrier coating material and a thermal barrier coating member having excellent thermal barrier property and thermal cycle durability can be provided. If these are used in a gas turbine, a highly reliable gas turbine can be constituted. Moreover, according to the present invention, a method for producing a thermal barrier coating member having the above properties can be provided. Furthermore, the present invention can provide a sintered body having high durability and thermal barrier effect with excellent versatility.

EXPLANATION OF REFERENCE SIGNS

Figure 1:
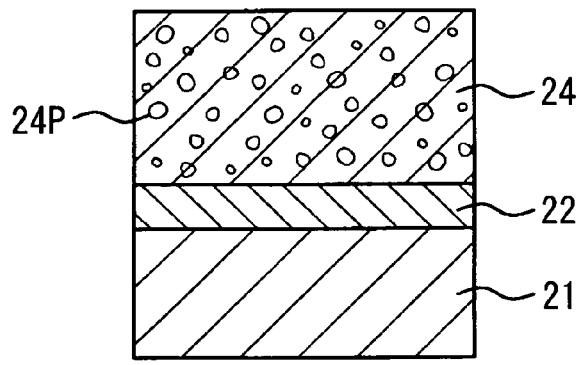
FIG. 1 is a schematic cross-sectional view of the thermal barrier coating member according to the third embodiment of the present invention.

21: Heat resistant substrate
22: Bond coat layer
24: Ceramic layer
24P: Pore
31: Heat resistant substrate
32: Bond coat layer
33: Zirconia-containing layer
33P: Pore
34: Ceramic layer
34P: Pore
41: Heat resistant substrate
42: Bond coat layer
43: Zirconia-containing layer
43C: Vertical crack
44: Ceramic layer
44P: Pore
51: Heat resistant substrate
52: Bond coat layer
54: Ceramic layer
54C: Vertical crack
61: Heat resistant substrate
62: Bond coat layer
63: Zirconia-containing layer
63C: Vertical crack
64: Ceramic layer
64C: Vertical crack
71: Heat resistant substrate
72: Bond coat layer
74: Ceramic layer
74L: Columnar crystal
140: Moving blade (turbine member)
141: Tab tail
142: Platform
143: Blade portion
150: Stationary blade (turbine member)
151: Inner shroud
152: Outer shroud
153: Blade portion
154: Cooling hole
155: Slit
160: Gas turbine
161: Compressor
162: Turbine
163: Combustor
164: Main shaft
165: Rotary shaft

BEST MODE FOR CARRYING OUT THE INVENTION

The heat resistant substrate to be used in the present invention includes a heat resistant alloy. Examples of the heat resistant alloy include CM247L (manufactured by Cannon Muskegon Corp.) used in a moving blade of a gas turbine, and IN939 (manufactured by Inco Ltd.) used in a stationary blade of a gas turbine. The part using the heat resistant substrate is preferably a part for gas turbines, such as parts used in turbine moving blades, turbine stationary blades, partitioning rings, and combustors. Although the required heat resistance depends on the uses, it is preferable to resist a temperature of at least 700° C. or higher.

According to the present invention, a bond coat layer is formed on the heat resistant substrate.

The bond coat layer can have a high oxidation resistance, and can reduce the difference in the coefficient of thermal expansion between the heat resistant substrate and the ceramic layer, or between the heat resistant substrate and the zirconia-containing layer so as to relax the thermal stress. Therefore, a long-time durability due to the high oxidation resistance and excellent thermal cycle durability can be obtained so that the spalling of the ceramic layer or the zirconia-containing layer from the bond coat layer can be prevented. Moreover, the bond coat layer joins the heat resistant substrate and the ceramic layer together, or the heat resistant substrate and the zirconia-containing layer together, more strongly, which can also contribute to the improvement of the strength of the thermal barrier coating.

When a layer having pores or a layer having vertical cracks is provided on the bond coat layer, a material having excellent oxidation resistance and corrosion resistance is preferably used for the bond coat layer in order to prevent oxidation or corrosion of the heat resistant substrate at high temperatures. Moreover, a material having excellent ductility is preferably used to efficiently relax a generated stress.

The bond coat layer is preferably of an MCrAlY alloy ("M" represents a metal element) having excellent corrosion resistance and oxidation resistance. "M" is preferably a single metal element such as Ni, Co, and Fe, or a combination of two types or more of these elements.

The method for forming the bond coat layer is not specifically limited, and a low-pressure plasma spraying method, an electron-beam physical vapor deposition method, or the like can be used.

The thickness of the bond coat layer is not specifically limited, although it is preferably not smaller than 0.01 mm and not greater than 1 mm. If the thickness is greater than 0.01 mm, the oxidation resistance may be insufficient; and if the thickness exceeds 1 mm, the ductility or tenacity of the film may be insufficient.

According to the present invention, a ceramic layer comprising an oxide which consists of an oxide represented by the general formula $A_2Zr_2O_7$ (where A represents any of La, Nd, Sm, Gd, and Dy) doped with at least either one of CaO in an amount not smaller than 5 mol % and not larger than 30 mol % and MgO in an amount not smaller than 5 mol % and not greater 30 mol %, and having 10 volume % or more of a pyrochlore type crystal structure, is formed as a top coat. Or, according to the present invention, a ceramic layer comprising an oxide represented by the general formula $A'_1B_1Zr_2O_7$ (where A' and B each represent any of La, Nd, Sm, Gd, Dy, Ce, and Yb, and A' and B are mutually different elements), is formed as a top coat. Alternatively, according to the present invention, a ceramic layer comprising an oxide represented by the general formula $A''_2Ce_2O_7$ (where A'' represents any of La, Sm, and Yb), is formed as a top coat.

The oxide which consists of an oxide represented by the general formula $A_2Zr_2O_7$ doped with at least either one of CaO in an amount not smaller than 5 mol % and not larger than 30 mol % and MgO in an amount not smaller than 5 mol % and not larger than 30 mol % is preferably contained at 10 volume % or more in the ceramic layer. This ceramic layer has 10 volume % or more of a pyrochlore type crystal structure, to thereby realize a low thermal conductivity.

The oxide represented by the general formula $A'_1B_1Zr_2O_7$ is preferably contained at 10 volume % or more in the ceramic layer. This oxide represented by the general formula $A'_1B_1Zr_2O_7$ preferably has a pyrochlore structure so as to lower the thermal conductivity of the ceramic layer.

The oxide represented by the general formula $A''_2Ce_2O_7$ is preferably contained at 10 volume % or more in the ceramic layer. This oxide represented by the general formula $A''_2Ce_2O_7$ preferably has a pyrochlore type crystal structure so as to lower the thermal conductivity of the ceramic layer.

As the oxide which consists of an oxide represented by the general formula $A_2Zr_2O_7$ doped with predetermined amounts of at least either one of CaO and MgO, an oxide which consists of $Sm_2Zr_2O_7$ doped with 10 mol % of CaO and 10 mol % of MgO is particularly preferred since it has a lower thermal conductivity than those of a material having another $A_2Zr_2O_7$ doped with at least either one of CaO and MgO and a material consisting of an oxide represented by the general formula $A_2Zr_2O_7$ alone.

Moreover, as the oxide represented by the general formula $A'_1B_1Zr_2O_7$, $La_1Ce_1Zr_2O_7$ or $Sm_1Yb_1Zr_2O_7$ is particularly preferred since they have a low thermal conductivity and have a coefficient of linear expansion equivalent to that of YSZ.

Furthermore, as the oxide represented by the general formula $A''_2Ce_2O_7$, $La_2Ce_2O_7$ is particularly preferred since it has a low thermal conductivity and has a coefficient of linear expansion equivalent to that of YSZ.

The oxide represented by the general formula $A_2Zr_2O_7$, the general formula $A'_1B_1Zr_2O_7$, or the general formula $A''_2Ce_2O_7$ is used as a powder or as an ingot in accordance with the processing method.

As the method for synthesizing a powder of the oxide represented by the general formula $A_2Zr_2O_7$, the general formula $A'_1B_1Zr_2O_7$, or the general formula $A''_2Ce_2O_7$, a powder mixing method, a coprecipitation method, an alkoxide method, and the like are known. The powder mixing method is a method comprising steps of mixing: $A_2O_3$ powder and $ZrO_2$ powder; $A'_2O_3$ powder, $B_2O_3$ powder, and $ZrO_2$ powder; or $A''_2O_3$ powder and $CeO_2$ powder, in a slurry state using a ball mill or the like, drying the slurry, then heat-treating the powder to synthesize the oxide represented by the general formula $A_2Zr_2O_7$, the general formula $A'_1B_1Zr_2O_7$, or the general formula $A''_2Ce_2O_7$ by a solid-phase reaction method, and pulverizing to yield the $A_2Zr_2O_7$ powder, the $A'_1B_1Zr_2O_7$ powder, or the $A''_2Ce_2O_7$ powder. The coprecipitation method is a method comprising steps of adding a neutralizing agent such as ammonia to a solution of: A and Zr salts; A', B, and Zr salts; or A'' and Ce salts, to form a hydrate precipitation, heat-treating to effect the reaction to form the oxide represented by the general formula $A_2Zr_2O_7$, the general formula $A'_1B_1Zr_2O_7$, or the general formula $A''_2Ce_2O_7$, and then pulverizing to yield the $A_2Zr_2O_7$ powder, the $A'_1B_1Zr_2O_7$ powder, or the $A''_2Ce_2O_7$ powder. The alkoxide method is a method comprising steps of adding water to a solution of A-Zr alkoxide, A'-B—Zr alkoxide, or A''-Ce alkoxide in an organic solvent to form a hydrate precipitation, heat-treating to effect the reaction to form the oxide represented by the general formula $A_2Zr_2O_7$, the general formula $A'_1B_1Zr_2O_7$, or the general formula $A''_2Ce_2O_7$, and then pulverizing to yield the $A_2Zr_2O_7$ powder, the $A'_1B_1Zr_2O_7$ powder, or the $A''_2Ce_2O_7$ powder.

The oxide represented by the general formula $A_2Zr_2O_7$ is doped with at least either one of CaO in an amount not smaller than 5 mol % and not larger than 30 mol % and MgO in an amount not smaller than 5 mol % and not larger than 30 mol %.

As the method for doping the $A_2Zr_2O_7$ powder with at least either one of CaO and MgO, for example, the raw material shown in the abovementioned powder mixing method ($A_2O_3$ powder and $ZrO_2$ powder) may be added with a powder having at least either one of CaO and MgO as a main component, for use as a raw material, to synthesize the oxide in accordance with the powder mixing method.

For synthesizing an ingot of the oxide which consists of an oxide represented by the general formula $A_2Zr_2O_7$ doped with at least either one of CaO in an amount not smaller than 5 mol % and not larger than 30 mol % and MgO in an amount not smaller than 5 mol % and not larger than 30 mol %, the oxide represented by the general formula $A'_1B_1Zr_2O_7$, or the oxide represented by the general formula $A''_2Ce_2O_7$, there is employed a method in which a raw material having a predetermined composition is sintered or electromelted-and-solidified to yield the ingot.

The oxide which consists of an oxide represented by the general formula $A_2Zr_2O_7$ doped with at least either one of CaO in an amount not smaller than 5 mol % and not larger than 30 mol % and MgO in an amount not smaller than 5 mol % and not larger than 30 mol % is hereinafter also referred to as "CaO/MgO-doped $A_2Zr_2O_7$". Moreover, the CaO/MgO-doped $A_2Zr_2O_7$ is represented by the chemical formula of $A_2Ca_xMg_yZr_2O_7$ (x=0 and 0.05≤y≤0.30; 0.05≤x≤0.30 and y=0; or 0.05≤x≤0.30 and 0.05≤y≤0.30). The oxide represented by the general formula $A'_1B_1Zr_2O_7$ is also simply referred to as "$A'_1B_1Zr_2O_7$".

The thermal barrier coating material comprising CaO/MgO-doped $A_2Zr_2O_7$ or $A'_1B_1Zr_2O_7$ is obtained by, for example, granulating the slurry containing a powder of CaO/MgO-doped $A_2Zr_2O_7$ or $A'_1B_1Zr_2O_7$, water, a dispersing agent, and a binder using a spray dryer into spherical granules, and heat-treating the granules. Alternatively, the thermal barrier coating material comprising CaO/MgO-doped $A_2Zr_2O_7$ or $A'_1B_1Zr_2O_7$ can also be obtained by forming the slurry obtained in the stage of mixing the raw materials of CaO/MgO-doped $A_2Zr_2O_7$ or $A'_1B_1Zr_2O_7$ into spherical shapes by spray-drying and heat-treating the resultant product to yield a powder.

When the thermal spraying method is used as a processing method, a thermal barrier coating material comprising CaO/MgO-doped $A_2Zr_2O_7$ or $A'_1B_1Zr_2O_7$ is preferably classified into particles having diameters not smaller than 10 μm and not larger 200 μm, and is adjusted to the particle size suitable for the thermal spraying before being used. Moreover, when the electron-beam physical vapor deposition method is used, a sintered ingot can be used as a target material.

As the method for forming a CaO/MgO-doped $A_2Zr_2O_7$ layer or an $A'_1B_1Zr_2O_7$ layer on a bond coat layer, an atmospheric plasma spraying method and an electron-beam physical vapor deposition method can be enumerated.

As the method for forming a CaO/MgO-doped $A_2Zr_2O_7$ layer or a $A'_1B_1Zr_2O_7$ layer with use of the atmospheric plasma spraying method, for example, using a thermal spray gun manufactured by Sulzer Metco Ltd. (such as F4 Gun), a film can be formed from the abovementioned powder used in the thermal spraying method under typical conditions of a spray current of 600 (A), a spray distance of 150 (mm), a powder supply quantity of 60 (g/min), and $Ar/H_2$ flow rates of 35/7.4 (l/min).

As the method for forming a CaO/MgO-doped $A_2Zr_2O_7$ layer or a $A'_1B_1Zr_2O_7$ layer with use of the electron-beam physical vapor deposition method, for example, using an electron-beam vapor deposition apparatus manufactured by Ardennes (such as TUBA150), a film can be formed using the abovementioned ingot as a target material under typical conditions of an electron-beam output of 50 kW, a reduced-pressure environment at an atmosphere of $10^{-4}$ torr, and a temperature of the heat resistant substrate at 1,000° C.

Columnar crystals refer to crystals that have been nucleated on the surface of the bond coat and grown in the preferred crystal growth direction in a monocrystalline state. Since such crystals are separated from each other even when strain is applied to the heat resistant substrate, high durability is exhibited.

When no zirconia-containing layer is used, the thickness of the ceramic layer is not specifically limited, although it is preferably not smaller than 0.1 mm and not greater than 1 mm. If the thickness is smaller than 0.1 mm, thermal barrier property may be insufficient; and if it exceeds 1 mm, the thermal cycle durability may be insufficient. When the ceramic layer has pores or vertical cracks, the thickness of the ceramic layer is preferably not smaller 0.1 mm and not greater than 1 mm.

When a CaO/MgO-doped $A_2Zr_2O_7$ layer having $Sm_2Zr_2O_7$ doped with 10 mol % of CaO and 10 mol % of MgO is used as the ceramic layer, since the pyrochlore type whose XRD pattern mainly shows $Sm_{1.8}Ca_{0.1}Mg_{0.1}Zr_2O_7$ is made and the thermal conductivity is lowered, the film thickness can be reduced. In S. Bose, Journal of Thermal Spray Technology, Vol. 6 (1), March 1997, pp. 99-104, it is reported that the thermal cycle durability is improved when the film thickness is reduced. This report supports the high thermal cycle durability of the CaO/MgO-doped $A_2Zr_2O_7$ layer that can be thinned while maintaining the same thermal barrier effect. In this manner, the CaO/MgO-doped $A_2Zr_2O_7$ layer is preferable because of not only the low thermal conductivity but also the high thermal cycle durability.

The ceramic layer preferably has a porosity (volume occupancy rate of pores formed in the ceramic layer with respect to the ceramic layer) of not lower than 1% and not higher than 30%. Since the presence of pores can improve the thermal barrier property of the ceramic-containing layer and can lower the Young's modulus thereof, even if a high thermal stress is applied to the ceramic layer involved in thermal cycles, the stress can be relaxed. Accordingly, the thermal barrier coating member having excellent thermal cycle durability can be made.

If the porosity is lower than 1%, the Young's modulus becomes high because the layer is dense. Accordingly, when the thermal stress is increased, the spalling is apt to occur. Moreover, if the porosity exceeds 30%, adhesion to the bond coat or the zirconia-containing layer becomes insufficient so that the durability may be lowered.

The porosity of the ceramic layer can be readily controlled by adjusting the thermal spraying condition so that a ceramic layer having appropriate porosity can be formed. As the adjustable thermal spraying condition, the spray current, the plasma gas flow rate, and the spray distance can be enumerated.

Regarding the spray current, for example, by lowering from a usual value of 600 (A) to 400 (A), the porosity can be increased from about 5% to about 8%. Moreover, the porosity can also be decreased by increasing the current.

Regarding the plasma gas flow rate, for example, by increasing the hydrogen flow rate ratio from usual $Ar/H_2$ flow rates of 35/7.4 (l/min) to 37.3/5.1 (l/min), the porosity can be increased from about 5% to about 8%. Moreover, the porosity can be decreased by increasing the hydrogen quantity.

Regarding the spray distance, for example, by increasing from a usual value of 150 mm to 210 mm, the porosity can be increased from about 5% to 8%. The porosity can also be decreased by decreasing the spray distance. Furthermore, by the combination thereof, the porosity can be varied from about 1% to a maximum of about 30%.

According to the present invention, the ceramic layer preferably has a plurality of vertical cracks extending in the film thickness direction. The vertical cracks are intentionally introduced when the ceramic layer is formed so as to improve the spalling resistance of the ceramic layer.

Regarding the ceramic layer having a low coefficient of thermal expansion as compared to the heat resistant substrate and the bond coat layer, when thermal cycles involved in the start and shutdown of the turbine are applied, a stress due to the difference in the coefficient of thermal expansion from the heat resistant substrate and the bond coat layer is applied thereto. However, the vertical cracks can relax the stress applied to the ceramic layer by expanding or shrinking their widths.

Accordingly, the stress caused by the expansion and shrinkage involved in thermal cycles is little applied to the ceramic layer itself so that the spalling of the ceramic layer becomes extremely difficult to occur and the ceramic layer has excellent thermal cycle durability.

According to the present invention, vertical cracks can be introduced in the ceramic layer when thermal spraying is performed using thermal spraying powder. Film formation according to the thermal spraying method is performed by spraying the powder in a melted or partially melted state onto a heat resistant substrate, and rapidly quenching to solidify the powder on the surface of the heat resistant substrate. By increasing the temperature difference at the time of solidification on the surface of the heat resistant substrate so as to intentionally produce solidification cracks in the formed the ceramic layer, vertical cracks can be introduced in the ceramic layer.

Cracks produced in the ceramic layer have served as a causative factor of the spalling of the ceramic layer in thermal barrier coatings of conventional structures. However, the vertical cracks introduced in the ceramic layer according to the present invention do not cause the spalling. This is because the crystal structure in the vicinity of the vertical cracks differs from that in the vicinity of cracks in the ceramic layer generated by thermal cycles. In other words, as to the cracks generated by thermal cycles, the crystal phase of $ZrO_2$ changes from the t'-phase (metastable tetragonal phase) into the t-phase (tetragonal phase) and the C-phase (cubic phase) at high temperatures; and when the temperature of the thermal barrier coating is lowered, the t-phase, which is stable at high temperatures, changes into the m-phase (monoclinic phase) and C-phase (cubic phase) due to the lowered temperature. When the m-phase is formed, the volume change occurs. The m-phase is observed in the vicinity of the cracks generated by this volume change. Accordingly, since the phase transition between the m-phase and the t-phase occurs repeatedly by thermal cycles, the cracks are gradually developed, and eventually, the ceramic layer is spalled away.

On the other hand, as to the vertical cracks introduced in the ceramic layer according to the present invention, since the m-phase is little present in the vicinity thereof, little volume change involved in the phase transition occurs in the ceramic layer during thermal cycles so that the vertical cracks are hardly developed by the temperature difference involved in the thermal cycles. Accordingly, it is considered that the life of the ceramic layer is not shortened by the introduction of the vertical cracks.

The extending direction of the vertical cracks is preferably within ±40° to the normal line direction of the film surface. Since cracks in the surface direction of the ceramic layer easily cause the spalling of the ceramic layer, the extending direction of the vertical cracks is preferably parallel to the normal line direction of the film surface of the ceramic layer as much as possible. However, if the tilt is within ±40° to the normal line direction, the effect of preventing the spalling of the ceramic layer can be sufficiently obtained.

The more preferable range of the extending direction of the vertical cracks is within ±20° to the normal line direction of the film surface of the ceramic layer.

The interval (pitch) between vertical cracks in the ceramic layer is preferably not smaller than 5% and not larger than 100% of the total thickness of films formed on the heat resistant substrate (excluding the bond coat layer). For example, if the thickness of the ceramic layer is 0.5 mm, the pitch between vertical cracks is preferably within a range of not smaller than 0.025 mm and not larger than 0.5 mm. By introducing vertical cracks at such a pitch in the ceramic layer, a thermal barrier coating member comprising a ceramic layer having excellent spalling resistance can be obtained.

If the pitch is smaller than 5%, the bonding area with the underlying bond coat layer or the zirconia-containing layer may be narrowed to cause an insufficient adhesion so that spalling may be apt to occur. If the pitch exceeds 100%, a specific stress in the spalling direction may increase at the ends of the cracks to cause spalling.

A ceramic layer having vertical cracks can be formed during the formation of the ceramic layer with use of, for example, the thermal spraying method or the electron-beam physical vapor deposition method.

When a ceramic layer having vertical cracks is formed with use of the thermal spraying method, the vertical cracks can be introduced into the ceramic layer by shortening the spray distance (distance between a thermal spray gun and a heat resistant substrate) to about ¼ to ⅔ of the spray distance conventionally used in the formation of a zirconia layer; alternatively, by using the spray distance substantially same as that of conventional case, but elevating the electric power to be input into the thermal spray gun to about twice to 25 times of the conventionally used electric power. In other words, by raising the temperature of particles in a melted or partially melted state which fly to the heat resistant substrate comprising the bond coat layer or the zirconia-containing layer by thermal spraying, the temperature gradient at the time of the rapid quenching and solidification on the heat resistant substrate can be increased, and vertical cracks can be introduced by shrinkage during the solidification. According to this method, by adjusting the spray distance and/or the electric power to be input into the thermal spray gun, the interval of vertical cracks or the frequency (area density of vertical cracks) can be readily controlled so that a ceramic layer having desired properties can be formed. By so doing, a thermal barrier coating member having excellent spalling resistance and thermal cycle durability can be readily formed.

When a ceramic layer having vertical cracks is formed by the electron-beam physical vapor deposition method, for example, using an electron-beam vapor deposition apparatus manufactured by Ardennes (such as TUBA150), a ceramic layer having vertical cracks can be readily formed using the abovementioned ingot as a target material under typical conditions of an electron-beam output of 50 kW, a reduced-pressure environment at an atmosphere of $10^{-4}$ torr, and a temperature of the heat resistant substrate at 1,000° C.

According to the present invention, the top coat may comprise two layers of a zirconia-containing layer and a ceramic layer. In this case, the bond coat layer, the zirconia-containing layer, and the ceramic layer are sequentially formed from the surface of the heat resistant substrate outward. The zirconia-containing layer is preferably a layer of partially stabilized zirconia. By partially stabilizing zirconia, the stability of zirconia crystals is improved. Accordingly, even when it is used in a high-temperature part such as a turbine, the crystal phase of zirconia hardly changes during thermal cycles so that the cracking and the development thereof due to phase transformation can be prevented. By applying a relatively low-cost zirconia-containing layer having high durability and a high coefficient of linear expansion, the cost of the top coat can be reduced. Therefore, the thermal barrier coating member has excellent spalling resistance and excellent thermal cycle durability, and is suitable for high-temperature parts.

The partially stabilized zirconia is preferably zirconia stabilized by one or more selected from the group consisting of $Yb_2O_3$, $Y_2O_3$, $Dy_2O_3$, and $Er_2O_3$.

In the case of zirconia stabilized by $Yb_2O_3$, the content of $Yb_2O_3$ serving as the stabilizing agent is preferably not smaller than 8% by mass and not larger than 27% by mass in terms of the thermal cycle durability.

In the case of zirconia stabilized by $Yb_2O_3$ and $Er_2O_3$, preferably, the content of $Yb_2O_3$ serving as the stabilizing agent is not smaller than 0.1% by mass and not larger than 25% by mass, the content of $Er_2O_3$ serving as the stabilizing agent is not smaller than 0.1% by mass and not larger than 25% by mass, and the total content of $Yb_2O_3$ and $Er_2O_3$ is not smaller than 10% by mass and not larger than 30% by mass.

Even when the top coat comprises two layers of a zirconia-containing layer and a ceramic layer, the thickness of the entire top coat is preferably set to not smaller than 0.1 mm and not greater than 1 mm. In this case, the thickness of each of the zirconia-containing layer and the ceramic layer is preferably not smaller than 10% and not greater than 90% of the total thickness of the films formed on the heat resistant substrate (excluding the bond coat layer). The same applies to the case where either one, or both of, the zirconia-containing layer and the ceramic layer have pores or vertical cracks.

The zirconia-containing layer can be formed by a publicly known method. For example, a layer containing $Yb_2O_3$-stabilized zirconia can be formed by granulating a slurry containing a mixed powder produced by mixing $Yb_2O_3$ powder and $ZrO_2$ powder in a powder mixing method, water, a dispersing agent, and a binder using a spray dryer, and then heat-treating the granules to yield a thermal spraying powder, followed by the application of the thermal spraying method. Moreover, a layer containing $Yb_2O_3$-and-$Er_2O_3$-stabilized zirconia can be formed by granulating a slurry containing a mixed powder produced by mixing $Yb_2O_3$ powder, $Er_2O_3$ powder, and $ZrO_2$ powder in a powder mixing method, water, a dispersing agent, and a binder using a spray dryer, and then heat-treating the granules to yield a thermal spraying powder, followed by the application of the thermal spraying method. Thereby, a partially stabilized zirconia layer having excellent crystal stability and excellent spalling resistance can be readily produced at a high yield. The thermal spraying method includes an atmospheric plasma spraying method. The method is not limited to thermal spraying methods, and an electron beam physical vapor deposition method can also be used for lamination.

When the atmospheric plasma spraying method is used, for example, $ZrO_2$ powder and a predetermined addition ratio of $Yb_2O_3$ powder are prepared, and these powders are mixed in a ball mill together with an appropriate binder and an appropriate dispersing agent to make into a slurry form. Next, the mixture is granulated and dried with a spray dryer, and then is subjected to a diffusion heat treatment which heats to a temperature not lower than 1200° C. and not higher than 1600° C. to yield a solid solution, so as to obtain $ZrO_2$—$Yb_2O_3$ composite powder having $Yb_2O_3$ evenly dispersed therein. Then, by thermal-spraying the composite powder onto a bond coat layer, an YbSZ layer can be obtained.

Moreover, when the electron-beam physical vapor deposition method is used for forming a zirconia-containing layer, an ingot obtained by sintering or electromelting-and-solidifying a raw material having a predetermined composition is used.

Furthermore, when zirconia stabilized by $Yb_2O_3$ and $Er_2O_3$ is used, a layer containing $Yb_2O_3$-and-$Er_2O_3$-stabilized zirconia can be formed on the bond coat layer by preparing $ZrO_2$ powder and predetermined addition ratios of $Yb_2O_3$ powder and $Er_2O_3$ powder to form $ZrO_2$—$(Yb_2O_3+Er_2O_3)$ composite powder in the same manner as described above, followed by thermal spraying or electron-beam physical vapor deposition using this composite powder.

The zirconia-containing preferably has a porosity (volume occupancy rate of pores formed in the zirconia-containing layer with respect to the zirconia-containing layer) of not lower than 1% and not higher than 30%. Since the presence of pores can improve the thermal barrier property of the partially stabilized zirconia-containing layer, even if a high thermal stress is applied to the zirconia-containing layer involved in thermal cycles, the stress can be relaxed. Accordingly, the thermal barrier coating member having excellent thermal cycle durability can be made.

If the porosity is lower than 1%, the Young's modulus becomes high because the layer is dense. Accordingly, when the thermal stress is increased, the spalling is apt to occur. Moreover, if the porosity exceeds 30%, adhesion to the bond coat becomes insufficient so that the durability may be lowered.

Moreover, the porosity of the zirconia-containing layer can be readily controlled by adjusting the spray current and the spray distance so that a zirconia-containing layer having appropriate porosity can be formed. By so doing, a thermal barrier coating member having excellent spalling resistance can be obtained.

Regarding the spray current, for example, by lowering from a usual value of 600 (A) to 400 (A), the porosity can be increased from about 5% to about 8%. Moreover, the porosity can also be decreased by increasing the current.

Regarding the plasma gas flow rate, for example, by increasing the hydrogen flow rate ratio from usual $Ar/H_2$ flow rates of 35/7.4 (l/min) to 37.3/5.1 (l/min), the porosity can be increased from about 5% to about 8%. Moreover, the porosity can be decreased by increasing the hydrogen quantity.

Regarding the spray distance, for example, by increasing from a usual value of 150 mm to 210 mm, the porosity can be increased from about 5% to about 8%. The porosity can also be decreased by decreasing the spray distance. Furthermore, by the combination thereof, the porosity can be varied from about 1% to a maximum of about 30%.

According to the present invention, the zirconia-containing layer preferably has a plurality of vertical cracks extending in the film thickness direction. The vertical cracks are intentionally introduced when the zirconia-containing layer is formed so as to improve the spalling resistance of the zirconia-containing layer.

Regarding the zirconia-containing layer having a low coefficient of thermal expansion as compared to the heat resistant substrate and the bond coat layer, when thermal cycles involved in the start and shutdown of the turbine are applied, a stress due to the difference in the coefficient of thermal expansion from the heat resistant substrate and the bond coat layer is applied thereto. However, the vertical cracks can relax the stress applied to the zirconia-containing layer by expanding or shrinking their widths.

Accordingly, the stress caused by the expansion and shrinkage involved in thermal cycles is little applied to the zirconia-containing layer itself so that the spalling of the partially stabilized zirconia-containing layer becomes extremely difficult to occur and the zirconia-containing layer has excellent thermal cycle durability.

According to the present invention, vertical cracks can be introduced in the zirconia-containing layer when thermal spraying is performed using thermal spraying powder. Film formation according to the thermal spraying method is performed by spraying the powder in a melted or partially melted state onto a heat resistant substrate, and rapidly quenching to solidify the powder on the surface of the heat resistant substrate. By increasing the temperature difference at the time of solidification on the surface of the heat resistant substrate so as to intentionally produce solidification cracks in the formed the zirconia-containing layer, vertical cracks can be introduced in the zirconia-containing layer.

Cracks produced in the zirconia-containing layer have served as a causative factor of the spalling of the zirconia-containing layer in thermal barrier coatings of conventional structures. However, the vertical cracks introduced in the zirconia-containing layer according to the present invention do not cause the spalling. This is because the crystal structure in the vicinity of the vertical cracks differs from that in the vicinity of cracks in the zirconia-containing layer generated by thermal cycles. In other words, as to the cracks generated by thermal cycles, the crystal phase of $ZrO_2$ changes from the t'-phase (metastable tetragonal phase) into the t-phase (tetragonal phase) and the C-phase (cubic phase) at high temperatures; and when the temperature of the thermal barrier coating is lowered, the t-phase, which is stable at high temperatures, changes into the m-phase (monoclinic phase) and C-phase (cubic phase) due to the lowered temperature. When the m-phase is formed, the volume change occurs. The m-phase is observed in the vicinity of the cracks generated by this volume change. Accordingly, since the phase transition between the m-phase and the t-phase occurs repeatedly by thermal cycles, the cracks are gradually developed, and eventually, the zirconia-containing layer is spalled away.

On the other hand, as to the vertical cracks introduced in the zirconia-containing layer according to the present invention, since the m-phase is little present in the vicinity thereof, little volume change involved in the phase transition occurs in the zirconia-containing layer during thermal cycles so that the vertical cracks are hardly developed by the temperature difference involved in the thermal cycles. Accordingly, it is considered that the life of the zirconia-containing layer is not shortened by the introduction of the vertical cracks.

The extending direction of the vertical cracks is preferably within ±40° to the normal line direction of the film surface. Since cracks in the surface direction of the zirconia-containing layer easily cause the spalling of the zirconia-containing layer, the extending direction of the vertical cracks is preferably parallel to the normal line direction of the film surface of the zirconia-containing layer as much as possible. However, if the tilt is within ±40° to the normal line direction, the effect of preventing the spalling of the zirconia-containing layer can be sufficiently obtained.

The more preferable range of the extending direction of the vertical cracks is within ±20° to the normal line direction of the film surface of the zirconia-containing layer.

The interval (pitch) between vertical cracks in the zirconia-containing layer is preferably not smaller than 5% and not larger than 100% of the total thickness of films formed on the heat resistant substrate (excluding the bond coat layer). By introducing vertical cracks at such a pitch in the zirconia-containing layer, a thermal barrier coating comprising a zirconia-containing layer having excellent spalling resistance can be obtained. If the pitch is smaller than 5%, the bonding area with the underlying bond coat layer may be narrowed to cause an insufficient adhesion so that spalling may be apt to occur. If the pitch exceeds 100%, a specific stress in the spalling direction may increase at the ends of the cracks to cause spalling.

A zirconia-containing layer having vertical cracks can be formed during the formation of the zirconia-containing layer with use of, for example, the thermal spraying method or the electron-beam physical vapor deposition method.

When a zirconia-containing layer having vertical cracks is formed with use of the thermal spraying method, the vertical cracks can be introduced into the zirconia-containing layer by shortening the spray distance (distance between a thermal spray gun and a heat resistant substrate) to about ¼ to ⅔ of the spray distance conventionally used in the formation of a zirconia-containing layer; alternatively, by using the spray distance substantially same as that of conventional case, but elevating the electric power to be input into the thermal spray gun to about twice to 25 times of the conventionally used electric power. In other words, by raising the temperature of particles in a melted or partially melted state which fly to the heat resistant substrate comprising the bond coat layer by thermal spraying, the temperature gradient at the time of the rapid quenching and solidification on the heat resistant substrate can be increased, and vertical cracks can be introduced by shrinkage during the solidification. According to this method, by adjusting the spray distance and/or the electric power to be input into the thermal spray gun, the interval of vertical cracks or the frequency (area density of vertical cracks) can be readily controlled so that a zirconia-containing layer having desired properties can be formed. By so doing, a thermal barrier coating member having excellent spalling resistance and thermal cycle durability can be readily formed.

When a zirconia-containing layer having vertical cracks is formed by the electron-beam physical vapor deposition method, for example, using an electron-beam vapor deposition apparatus manufactured by Ardennes (such as TUBA150), a zirconia-containing layer having vertical cracks can be readily formed using the abovementioned ingot as a target material under typical conditions of an electron-beam output of 50 kW, a reduced-pressure environment at an atmosphere of $10^{-4}$ torr, and a temperature of the heat resistant substrate at 1,000° C.

Hereunder is a description of several preferred embodiments of the present invention with reference to the drawings, but the present invention is not to be construed as being limited to these embodiments.

The first embodiment is a thermal barrier coating member comprising a bond coat layer and a ceramic layer which comprises CaO/MgO-doped $A_2Zr_2O_7$, in sequence on a heat-resistant substrate. The thickness of the bond coat layer is not smaller than 0.01 mm and not greater than 1 mm. The thickness of the ceramic layer is not smaller than 0.1 mm and not greater than 1 mm. The bond coat layer is formed from an MCrAlY alloy ("M" represents a metal element, and is preferably a single metal element such as Ni, Co, and Fe, or a combination of two types or more of these elements.) as a raw material, by the low-pressure plasma spraying method, the electron-beam physical vapor deposition method, or the like. The ceramic layer which comprises CaO/MgO-doped $A_2Zr_2O_7$ is formed by the thermal spraying method using a powder of CaO/MgO-doped $A_2Zr_2O_7$ as a thermal spraying powder material, or by the deposition method using a sintered ingot of CaO/MgO-doped $A_2Zr_2O_7$ as a target material. The oxide represented by the general formula $A_2Zr_2O_7$ is preferably $Sm_2Zr_2O_7$. This is because the thermal conductivity is low as shown in the experimental examples described later. The thermal barrier coating member is preferably used for parts of a gas turbine.

By using CaO/MgO-doped $A_2Zr_2O_7$, the thermal conductivity becomes lower as compared to YSZ while the coefficient of linear expansion is substantially equivalent to that of YSZ. For example, the thermal conductivity of a thermal sprayed YSZ coating is 0.74 W/mK to 2.02 W/mK (from experimental values).

The second embodiment is a thermal barrier coating member comprising a bond coat layer and a ceramic layer which comprises $A'_1B_1Zr_2O_7$, in sequence on a heat-resistant substrate. The thickness of the bond coat layer is not smaller than 0.01 mm and not greater than 1 mm. The thickness of the ceramic layer is not smaller than 0.1 mm and not greater than 1 mm. The bond coat layer is formed from an MCrAlY alloy ("M" represents a metal element, and is preferably a single metal element such as Ni, Co, and Fe, or a combination of two types or more of these elements.) as a raw material, by the low-pressure plasma spraying method, the electron-beam physical vapor deposition method, or the like. The ceramic layer which comprises $A'_1B_1Zr_2O_7$ is formed by the thermal spraying method using a powder of $A'_1B_1Zr_2O_7$ as a thermal spraying powder material, or by the deposition method using a sintered ingot of $A'_1B_1Zr_2O_7$ as a target material. The oxide represented by the general formula $A'_1B_1Zr_2O_7$ is preferably $Sm_1Yb_1Zr_2O_7$. This is because it has a low thermal conductivity and a coefficient of linear expansion equivalent to that of YSZ. The thermal barrier coating member is preferably used for parts of a gas turbine.

By using $A'_1B_1Zr_2O_7$, the thermal conductivity becomes lower as compared to YSZ while the coefficient of linear expansion is substantially equivalent to that of YSZ. For example, the thermal conductivity of a thermal sprayed YSZ coating is 0.74 W/mK to 2.02 W/mK, while the thermal conductivity of $A'_1B_1Zr_2O_7$ is normally 0.3 W/mK to 1.5 W/mK.

In the third embodiment, as shown in FIG. 1, the ceramic layer has pores, so that a thermal barrier coating member featuring in a low thermal conductivity can be obtained. FIG. 1 shows a thermal barrier coating member comprising a bond coat layer 22 and a ceramic layer 24 which comprises CaO/MgO-doped $A_2Zr_2O_7$ or $A'_1B_1Zr_2O_7$, in sequence on a heat-resistant substrate 21, wherein the ceramic layer 24 has pores 24P. The thickness of the bond coat layer 22 is not smaller than 0.01 mm and not greater than 1 mm. The thickness of the ceramic layer 24 is not smaller than 0.1 mm and not greater than 1 mm. The porosity of the ceramic layer 24 is not lower than 1% and not higher than 30%.

According to the third embodiment, a thermal barrier coating member comprising a thermal barrier coating film having low thermal conductivity is obtained. Accordingly, the reliability of the heat resistant substrate 21 can be improved. Moreover, the ductility of the heat resistant substrate 21 with respect to the ceramic layer 24 or the followability thereof in response to bending becomes equivalent to those with respect to YSZ.

Figure 2:
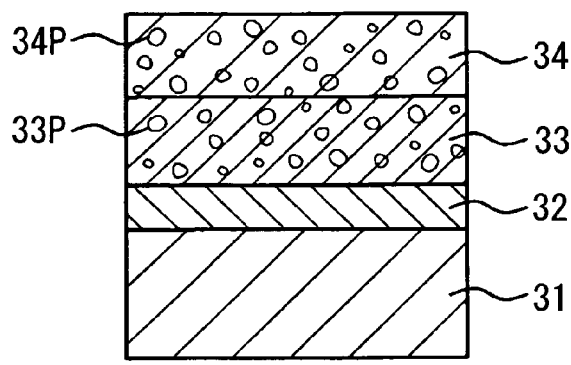
FIG. 2 is a schematic cross-sectional view of the thermal barrier coating member according to the fourth embodiment of the present invention.

In the fourth embodiment, as shown in FIG. 2, the ceramic layer and the zirconia-containing layer have pores, so that a thermal barrier coating member having low thermal conductivity and excellent durability can be obtained. FIG. 2 shows a thermal barrier coating member comprising a bond coat layer 32, a zirconia-containing layer 33, and a ceramic layer 34 which comprises CaO/MgO-doped $A_2Zr_2O_7$ or $A'_1B_1Zr_2O_7$, in sequence on a heat-resistant substrate 31, wherein the zirconia-containing layer 33 has pores 33P and the ceramic layer 34 has pores 34P. The thickness of the bond coat layer 32 is not smaller than 0.01 mm and not greater than 1 mm. The total thickness of the zirconia-containing layer 33 and the ceramic layer 34 is not smaller than 0.1 mm and not greater than 1 mm. The thickness of the zirconia-containing layer 33 is not smaller than 10% and not greater than 90% of the total thickness of the zirconia-containing layer 33 and the ceramic layer 34. The thickness of the ceramic layer 34 is not smaller than 10% and not greater than 90% of the total thickness of the zirconia-containing layer 33 and the ceramic layer 34 formed on the heat resistant substrate 31. The porosity of the zirconia-containing layer 33 and the ceramic layer 34 is respectively not lower than 1% and not higher than 30%.

According to the fourth embodiment, a thermal barrier coating member which comprises a thermal barrier coating film having low thermal conductivity and excellent durability is obtained by the zirconia-containing layer and the ceramic layer which have pores. Accordingly, the reliability of the heat resistant substrate 31 can be improved. Moreover, the thermal barrier coating member can be produced at low cost.

Figure 3:
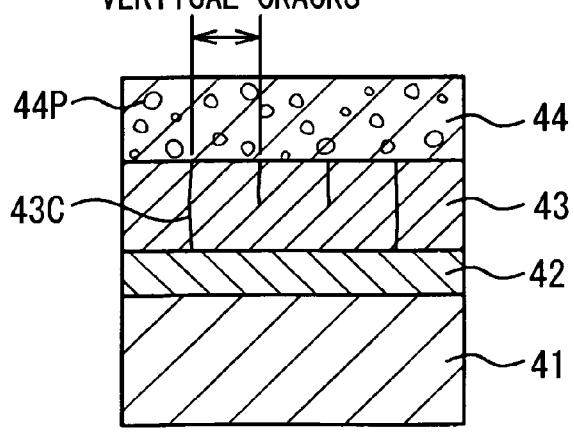
FIG. 3 is a schematic cross-sectional view of the thermal barrier coating member according to the fifth embodiment of the present invention.

In the fifth embodiment, as shown in FIG. 3, the ceramic layer has pores and the zirconia-containing layer has vertical cracks, so that a thermal barrier coating member having low thermal conductivity and high durability can be obtained. FIG. 3 shows a thermal barrier coating member comprising a bond coat layer 42, a zirconia-containing layer 43, and a ceramic layer 44 which comprises CaO/MgO-doped $A_2Zr_2O_7$ or $A'_1B_1Zr_2O_7$, in sequence on a heat-resistant substrate 41, wherein the zirconia-containing layer 43 has vertical cracks 43C and the ceramic layer 44 has pores 44P. The thickness of the bond coat layer 42 is not smaller than 0.01 mm and not greater than 1 mm. The total thickness of the zirconia-containing layer 43 and the ceramic layer 44 is not smaller than 0.1 mm and not greater than 1 mm. The thickness of the zirconia-containing layer 43 is not smaller than 10% and not greater than 90% of the total thickness of the zirconia-containing layer 43 and the ceramic layer 44. The thickness of the ceramic layer 44 is not smaller than 10% and not greater than 90% of the total thickness of the zirconia-containing layer 43 and the ceramic layer 44 formed on the heat resistant substrate 41. The interval between vertical cracks (pitch of vertical cracks) in the zirconia-containing layer 43 is not smaller than 5% and not larger than 100% of the total thickness of the zirconia-containing layer 43 and the ceramic layer 44. The extending direction of the vertical cracks is within ±40° to the normal line direction (vertical direction in the drawings) of the film surface. The porosity of the ceramic layer 44 is not lower than 1% and not higher than 30%.

According to the fifth embodiment, a thermal barrier effect is obtained by the ceramic layer having pores and a thermal cycle durability is obtained by the structure of vertical cracks of the zirconia-containing layer. Accordingly, the reliability of the heat resistant substrate 41 can be improved. Moreover, the thermal barrier coating member can be produced at low cost.

Figure 4:
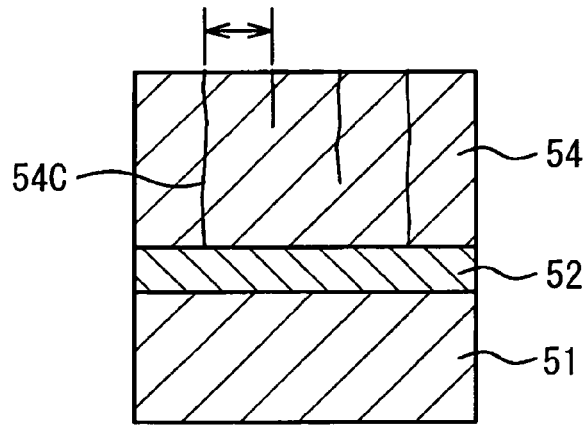
FIG. 4 is a schematic cross-sectional view of the thermal barrier coating member according to the sixth embodiment of the present invention.

In the sixth embodiment, as shown in FIG. 4, the ceramic layer is provided with vertical cracks, so that a thermal barrier coating member featuring in durability can be obtained. FIG. 4 shows a thermal barrier coating member comprising a bond coat layer 52 and a ceramic layer 54 which comprises CaO/MgO-doped $A_2Zr_2O_7$ or $A'_1B_1Zr_2O_7$, in sequence on a heat-resistant substrate 51, wherein the ceramic layer 54 has vertical cracks 54C. The thickness of the bond coat layer 52 is not smaller than 0.01 mm and not greater than 1 mm. The thickness of the ceramic layer 54 is not smaller than 0.1 mm and not greater than 1 mm. The pitch of vertical cracks is not smaller than 5% and not larger than 100% of the thickness of the ceramic layer 54. The extending direction of the vertical cracks is within ±40° to the normal line direction (vertical direction in the drawings) of the film surface.

According to the sixth embodiment, the thermal cycle durability is improved by the structure of vertical cracks of the ceramic layer.

Figure 5:
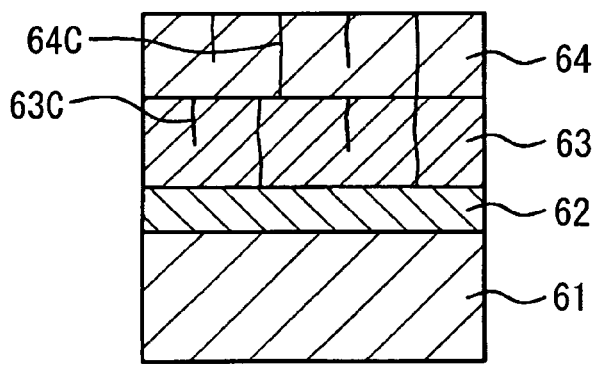
FIG. 5 is a schematic cross-sectional view of the thermal barrier coating member according to the seventh embodiment of the present invention.

In the seventh embodiment, as shown in FIG. 5, the ceramic layer and the zirconia-containing layer are provided with vertical cracks, so that a thermal barrier coating member which can be expected to have a super high durability with a normal thermal conductivity can be obtained. FIG. 5 shows a thermal barrier coating member comprising a bond coat layer 62, a zirconia-containing layer 63, and a ceramic layer 64 which comprises CaO/MgO-doped $A_2Zr_2O_7$ or $A'_1B_1Zr_2O_7$, in sequence on a heat-resistant substrate 61, wherein the zirconia-containing layer 63 has vertical cracks 63C and the ceramic layer 64 has vertical cracks 64C. The thickness of the bond coat layer 62 is not smaller than 0.01 mm and not greater than 1 mm. The total thickness of the zirconia-containing layer 63 and the ceramic layer 64 is not smaller than 0.1 mm and not greater than 1 mm. The thickness of the zirconia-containing layer 63 is not smaller than 10% and not greater than 90% of the total thickness of the zirconia-containing layer 63 and the ceramic layer 64. The thickness of the ceramic layer 64 is not smaller than 10% and not greater than 90% of the total thickness of the zirconia-containing layer 63 and the ceramic layer 64. The pitch of vertical cracks in the zirconia-containing layer 63 and the ceramic layer 64 is respectively not smaller than 5% and not larger than 100% of the total thickness of the zirconia-containing layer 63 and the ceramic layer 64. The extending direction of the vertical cracks is within ±40° to the normal line direction (vertical direction in the drawings) of the film surface.

According to the seventh embodiment, the thermal cycle durability is improved by the vertical crack structure of the zirconia-containing layer and the ceramic layer.

Figure 6:
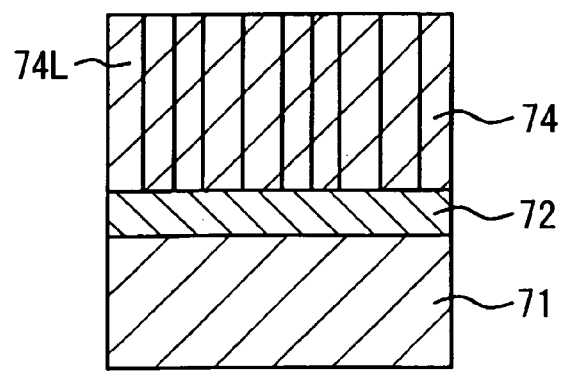
FIG. 6 is a schematic cross-sectional view of the thermal barrier coating member according to the eighth embodiment of the present invention.

In the eighth embodiment, as shown in FIG. 6, the ceramic layer is of a columnar structure using EB-PVD (electron-beam physical vapor deposition), so that a thermal barrier coating member having very high durability and low thermal conductivity can be obtained. FIG. 6 shows a thermal barrier coating member comprising a bond coat layer 72 and a ceramic layer 74 which comprises CaO/MgO-doped $A_2Zr_2O_7$ or $A'_1B_1Zr_2O_7$, in sequence on a heat-resistant substrate 71, wherein the ceramic layer 74 has a columnar structure 74L. The thickness of the bond coat layer 72 is not smaller than 0.01 mm and not greater than 1 mm. The thickness of the ceramic layer 74 is not smaller than 0.1 mm and not greater than 1 mm.

According to the eighth embodiment, the thermal cycle durability can be improved by the presence of the columnar structure of the ceramic layer. In this case, although the thermal conductivity is inferior to that of thermal spray coating, the thermal conductivity can be reduced by 20% or more as compared to YSZ obtained by EB-PVD.

The thermal barrier coating member according to the present invention is useful when it is applied to high-temperature parts such as the moving blades and the stationary blades of industrial gas turbines, or the inner cylinders and the tail cylinders of combustors. Moreover, the thermal barrier coating member can be applied not only to the industrial gas turbines, but also to the thermal barrier coating film of the high-temperature parts of engines for motor vehicles or jet aircraft. By coating these members with the thermal barrier coating film of the present invention, gas-turbine members or high-temperature parts having excellent thermal cycle durability can be composed.

Figure 7:
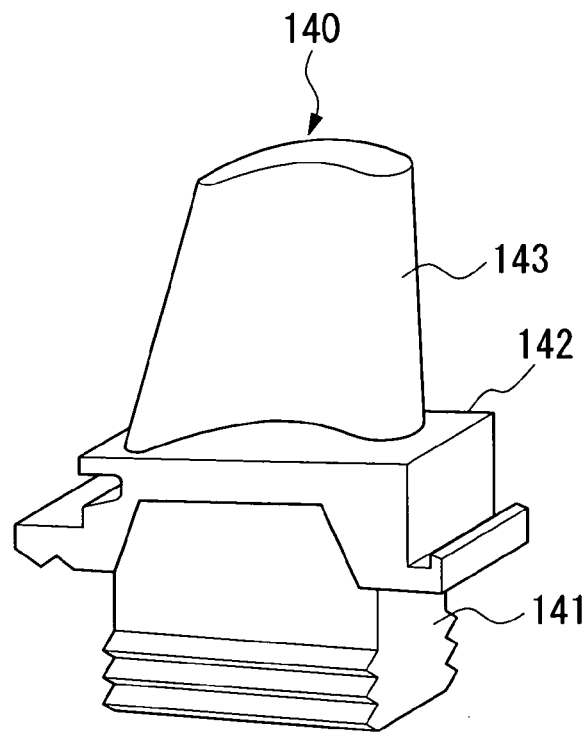
FIG. 7 is a perspective view showing a moving blade, which is an example of the turbine member according to the present invention.
Figure 8:
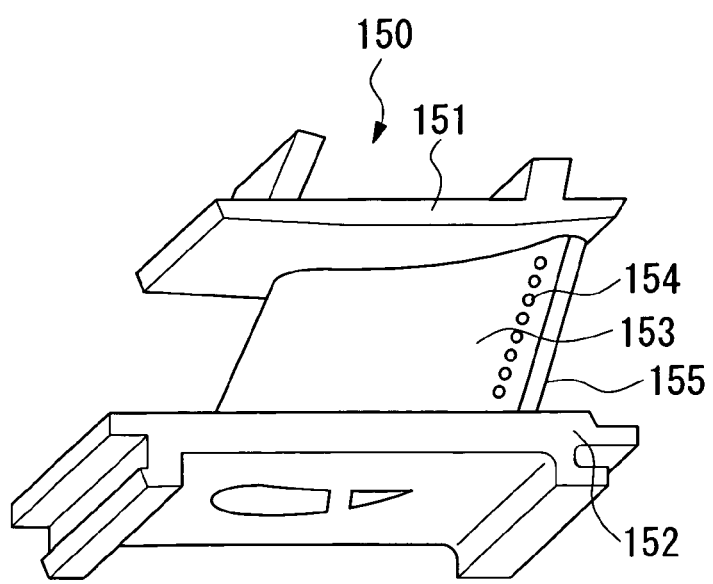
FIG. 8 is a perspective view showing a stationary blade, which is an example of the turbine member according to the present invention.

FIG. 7 and FIG. 8 are perspective views showing the configuration examples of turbine blades (turbine members) to which the thermal barrier coating film of the present invention can be applied. The moving blade 140 for a gas-turbine shown in FIG. 7 is equipped with a tab tail 141 fixed to the disc side, a platform 142, a blade portion 143, and the like. The stationary blade 150 for a gas-turbine shown in FIG. 8 is equipped with an inner shroud 151, an outer shroud 152, a blade portion 153, and the like, and seal fin cooling holes 154, a slit 155, and the like are formed in the blade portion 153.

Figure 9:
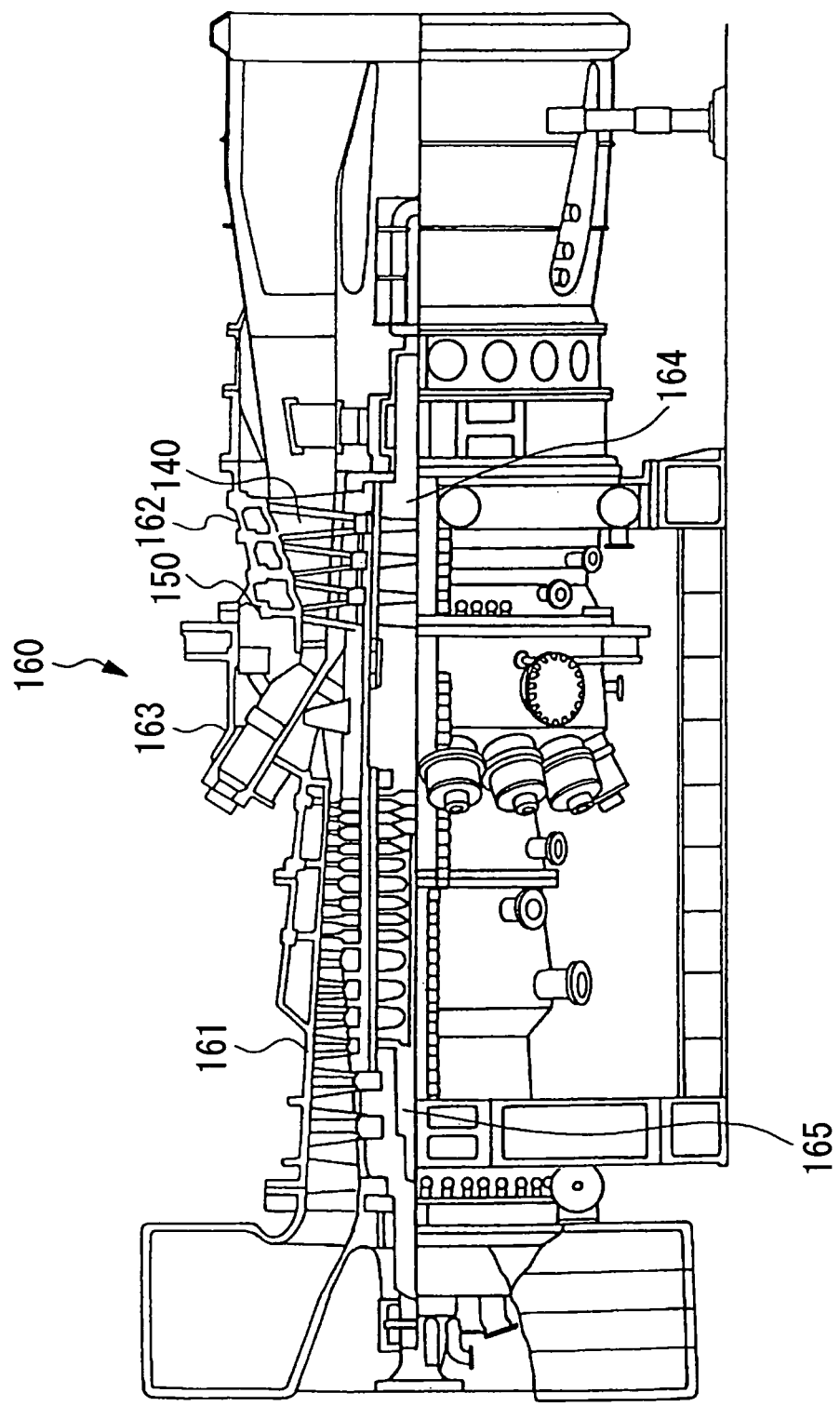
FIG. 9 is a partially cross-sectional view showing an example of a gas turbine equipped with gas turbine members shown in FIG. 7 and FIG. 8.

A gas turbine to which turbine blades 140 and 150 shown in FIG. 7 and FIG. 8 can be applied, will be described with reference to FIG. 9. FIG. 9 schematically shows a partially cross-sectional structure of a gas turbine according to the present invention. This gas turbine 160 is equipped with a compressor 161 and a turbine 162 which are directly connected to each other. The compressor 161 is constituted as for example, an axial flow compressor and sucks the air or a predetermined gas from a suction port as a working fluid and elevates the pressure thereof. A combustor 163 is connected to the discharge port of the compressor 161, and the working fluid discharged from the compressor 161 is heated by the combustor 163 to a predetermined inlet temperature of the turbine. The working fluid heated to the predetermined temperature is supplied to the turbine 162. As shown in FIG. 9, several stages (4 stages in FIG. 9) of the gas turbine stationary blades 150 mentioned above are installed in the casing of the turbine 162. Moreover, the gas turbine moving blades 140 mentioned above are attached to a main shaft 164 so as to form a set of stage with each stationary blade 150. An end of the main shaft 164 is connected to the rotary shaft 165 of the compressor 161, and the other end is connected with the rotary shaft of a power generator (not shown).

According to such a configuration, when a high-temperature high-pressure working fluid is supplied from the combustor 163 into the casing of the turbine 162, the working fluid is expanded in the casing to thereby rotate the main shaft 164, and the power generator (not shown) connected to this gas turbine 160 is driven. In other words, the pressure is lowered by each stationary blade 150 fixed to the casing, and thus generated kinetic energy is converted into a rotation torque through each moving blade 140 attached to the main shaft 164. Then, the generated rotation torque is transmitted to the rotary shaft 165 so that the power generator is driven.

When the thermal barrier coating member of the present invention is used for these turbine blades, turbine blades have excellent thermal barrier effect and spalling resistance, and thus long-life turbine blades which can be used in a higher temperature environment with excellent durability can be realized. Moreover, the possibility of application in a higher temperature environment means that the temperature of the working fluid can be elevated, and thereby, the efficiency of the gas turbine can be improved. Further, since the thermal barrier coating member of the present invention have excellent thermal barrier property, the flow rate of cooling air can be reduced so as to contribute to the improvement of performance.

The thermal barrier coating member of the present invention can be applied not only to gas turbines but also to the piston crowns of diesel engines, the parts of jet engines, and the like.

In the ninth embodiment, a sintered body is produced using an oxide which consists of an oxide represented by the general formula $A_2Zr_2O_7$ doped with at least either one of CaO in an amount not smaller than 5 mol % and not larger than 30 mol % and MgO in an amount not smaller than 5 mol % and not larger than 30 mol % (CaO/MgO-doped $A_2Zr_2O_7$). As the oxide represented by the general formula $A_2Zr_2O_7$, CaO/MgO-doped $A_2Zr_2O_7$ having $Sm_2Zr_2O_7$ doped with 10 mol % of CaO and 10 mol % of MgO, respectively, is preferred. This is because the XRD pattern mainly shows $Sm_{1.8}Ca_{0.1}Mg_{0.1}Zr_2O_7$ and the thermal conductivity is low as shown in the experimental examples described later. The sintered body can be used for ceramics tiles for spacecraft, and the like.

By using CaO/MgO-doped $A_2Zr_2O_{70}$, this sintered body has a lower thermal conductivity as compared to YSZ.

In the tenth embodiment, a sintered body is produced using an oxide represented by the general formula $A'_1B_1Zr_2O_7$. As the oxide represented by the general formula $A'_1B_1Zr_2O_7$, $Sm_1Yb_1Zr_2O_7$ is preferred. This is because it has a low thermal conductivity and a coefficient of linear expansion equivalent to that of YSZ. The sintered body can be used for ceramics tiles for spacecraft, and the like.

By using $A'_1B_1Zr_2O_7$, this sintered body has a lower thermal conductivity as compared to YSZ.

In the eleventh embodiment, a sintered body is produced using an oxide represented by the general formula $A''_2Ce_2O_7$. As the oxide represented by the general formula $A''_2Ce_2O_7$, $La_2Ce_2O_7$ is preferred. This is because it has a low thermal conductivity and a coefficient of linear expansion equivalent to that of YSZ. The sintered body can be used for ceramics tiles for spacecraft, and the like.

By using $A''_2Ce_2O_7$, this sintered body has a lower thermal conductivity as compared to YSZ.

EXAMPLES

Hereunder is a description of Examples of the present invention, but the present invention is not to be construed as being limited to these Examples.

Composition Example 1

A composition having $Sm_2Zr_2O_7$ doped with 10 mol % of MgO is referred to as Composition Example 1. To obtain this composition, $Sm_2O_3$ powder ($Sm_2O_3$ in fine powder of 99.9% purity, manufactured by Nippon Yttrium Co., Ltd.) and MgO powder (magnesium carbonate converted as MgO, manufactured by Tateho Chemical Industries Co., Ltd.) were used together with $ZrO_2$ powder ($ZrO_2$ in fine powder TZ-0, manufactured by Nippon Yttrium Co., Ltd.), as raw materials.

Composition Example 2

A composition having $Sm_2Zr_2O_7$ doped with 20 mol % of MgO is referred to as Composition Example 2. To obtain this composition, the same raw materials as those of Composition Example 1 were used except for that the addition amount of MgO was changed.

Composition Example 3

A composition having $Sm_2Zr_2O_7$ doped with 10 mol % of CaO is referred to as Composition Example 3. To obtain this composition, the same raw materials as those of Composition Example 1 were used except for that CaO was used instead of MgO, wherein a calcium carbonate reagent manufactured by Wako Pure Chemical Industries, Ltd. was converted as CaO and used as the raw material of CaO.

Composition Example 4

A composition having $Sm_2Zr_2O_7$ doped with 20 mol % of CaO is referred to as Composition Example 4. To obtain this composition, the same raw materials as those of Composition Example 3 were used except for that the addition amount of CaO was changed.

Composition Example 5

A composition having $Sm_2Zr_2O_7$ doped with 10 mol % of CaO and 10 mol % of MgO is referred to as Composition Example 5. To obtain this composition, $Sm_2O_3$ powder ($Sm_2O_3$ in fine powder of 99.9% purity, manufactured by Nippon Yttrium Co., Ltd.), MgO powder (high purity magnesia, manufactured by Tateho Chemical Industries Co., Ltd.), and calcium carbonate (calcium carbonate reagent converted as CaO, manufactured by Wako Pure Chemical Industries, Ltd.) were used together with $ZrO_2$ powder ($ZrO_2$ in fine powder TZ-0, manufactured by Nippon Yttrium Co., Ltd.), as raw materials.

Composition Example 6

A composition of $Sm_1Yb_1Zr_2O_7$ is referred to as Composition Example 6. To obtain this composition, $Sm_2O_3$ powder ($Sm_2O_3$ in fine powder of 99.9% purity, manufactured by Nippon Yttrium Co., Ltd.) and $Yb_2O_3$ powder ($Yb_2O_3$ powder of 99.9% purity, manufactured by Nippon Yttrium Co., Ltd.) were used together with $ZrO_2$ powder ($ZrO_2$ in fine powder TZ-0, manufactured by Nippon Yttrium Co., Ltd.), as raw materials.

Composition Example 7

A composition of $La_1Ce_1Zr_2O_7$ is referred to as Composition Example 7. To obtain this composition, $La_2O_3$ powder (lanthanum hydroxide converted as $La_2O_3$, manufactured by Nippon Yttrium Co., Ltd.), and $Ce_2O_3$ powder ($Ce_2O_3$ powder of 99.9% purity, manufactured by Nippon Yttrium Co., Ltd.) were used together with $ZrO_2$ powder ($ZrO_2$ in fine powder TZ-0, manufactured by Nippon Yttrium Co., Ltd.), as raw materials.

Composition Example 8

A composition of $La_2Ce_2O_7$ is referred to as Composition Example 8. To obtain this composition, $La_2O_3$ powder (lanthanum hydroxide converted as $La_2O_3$, manufactured by Nippon Yttrium Co., Ltd.) and $Ce_2O_3$ powder ($Ce_2O_3$ powder of 99.9% purity, manufactured by Nippon Yttrium Co., Ltd.) were used as raw materials.

Comparative Composition Example 1

YSZ containing 8% by mass of $Y_2O_3$ is referred to as Comparative Composition Example 1. To obtain this composition, 204NS-G (at a blending ratio of 8% by mass of yttria and 92% by mass of zirconia) manufactured by Sulzer Metco Ltd. was used as a raw material.

Comparative Composition Example 2

$Sm_2Zr_2O_7$ is referred to as Comparative Composition Example 2. To obtain this composition, $Sm_2O_3$ powder ($Sm_2O_3$ in fine powder of 99.9% purity, manufactured by Nippon Yttrium Co., Ltd.) was used together with $ZrO_2$ powder ($ZrO_2$ in fine powder TZ-0, manufactured by Nippon Yttrium Co., Ltd.), as raw materials.

Example 1 to Example 7, Comparative Example 1, and Comparative Example 2

Figure 10:
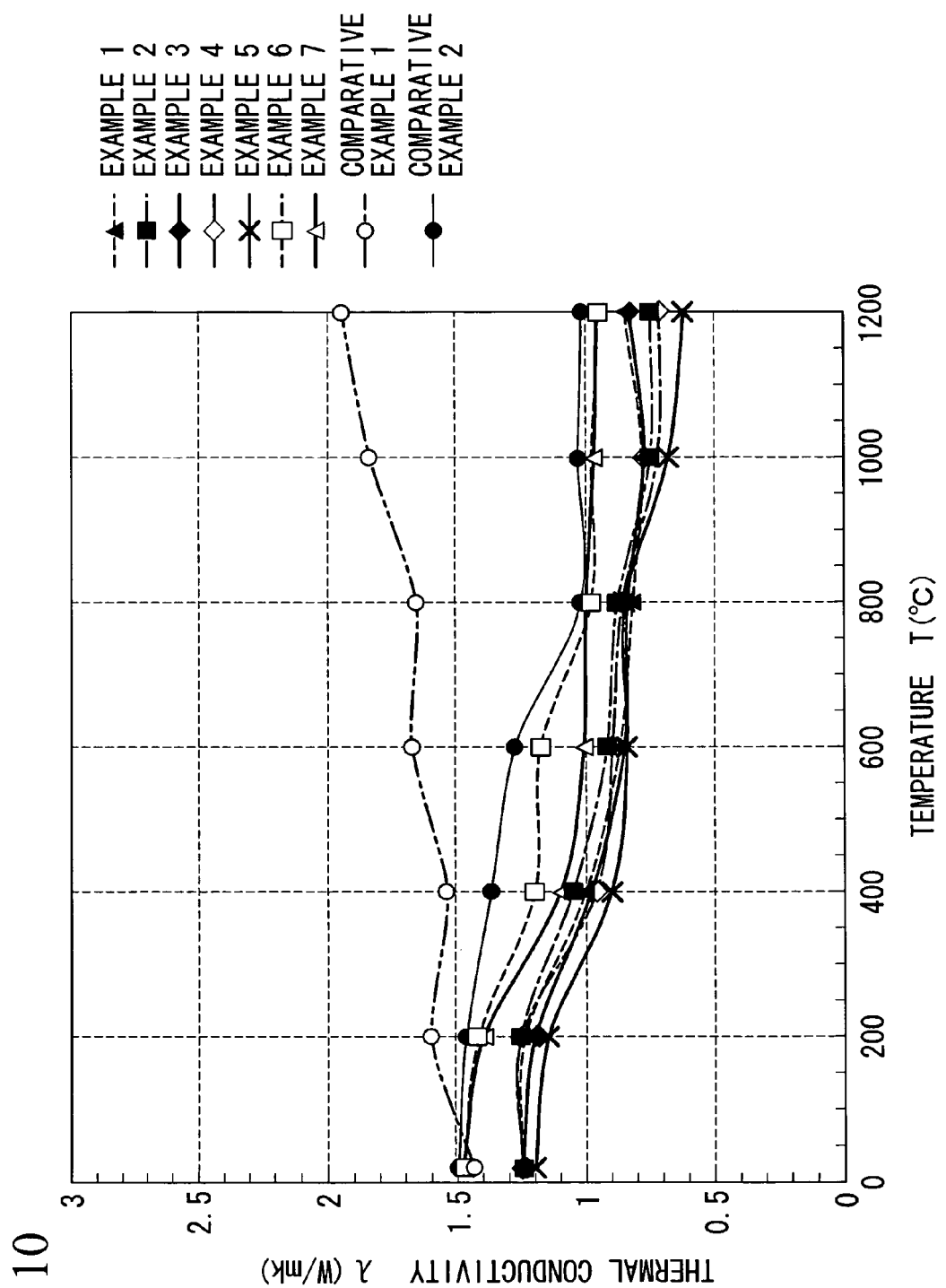
FIG. 10 is a graph showing measurement results of the thermal conductivity of sintered bodies of Example 1 to Example 7, Comparative Example 1, and Comparative Example 2.

Sintered bodies of Example 1 to Example 8, Comparative Example 1, and Comparative Example 2 respectively having the composition of Composition Example 1 to Composition Example 8, Comparative Composition Example 1, and Comparative Composition Example 2 mentioned above were produced respectively using the raw materials described in Composition Example 1 to Composition Example 8, Comparative Composition Example 1, and Comparative Composition Example 2 mentioned above, by an ordinary-pressure sintering method at a sintering temperature of 1700° C. for a sintering time of 4 hours. The thermal conductivities of respective sintered bodies of Example 1 to Example 7, Comparative Example 1, and Comparative Example 2 are shown in FIG. 10.

Moreover, as to Example 5, Example 6, Example 8, and Comparative Example 1, their thermal conductivities at 800° C. are shown in Table 1.

The thermal conductivity was measured by a laser flash method specified in JIS R1611.

TABLE 1

|  | Comparative Example 1 | Example 5 | Example 6 | Example 8 |
|---|---|---|---|---|
| Thermal conductivity at 800° C. (W/mK) | 2.11 | 0.85 | 0.98 | 1.0 |

Example 9 to Example 16, Comparative Example 3, and Comparative Example 4

Ceramic layers (top coat layers) respectively having the composition of Composition Example 1 to Composition Example 8, Comparative Composition Example 1, and Comparative Composition Example 2 mentioned above were formed by the following methods to produce samples of Example 9 to Example 16, Comparative Example 3, and Comparative Example 4.

As the heat resistant substrate, an Ni-based heat resistant alloy was used. The alloy composition was 16% by mass of Cr, 8.5% by mass of Co, 1.75% by mass of Mo, 2.6% by mass of W, 1.75% by mass of Ta, 0.9% by mass of Nb, 3.4% by mass of Al, 3.4% by mass of Ti, and the balance being Ni. The dimension of the heat resistant substrate was designed as a rectangular solid having a thickness of 2 mm, a width of 3 mm, and a length of 26 mm.

The surface of the heat resistant substrate was subjected to grid blasting with $Al_2O_3$ particles, on which thereafter a bond coat layer consisting of a CoNiCrAlY alloy having a composition of 32% by mass of Ni, 21% by mass of Cr, 8% by mass of Al, 0.5% by mass of Y, and the balance being Co was formed in a thickness of 0.1 mm by a low-pressure plasma spraying method.

On this CoNiCrAlY bond coat layer, a ceramic layer (top coat layer) respectively having the composition of Composition Example 1 to Composition Example 7, Comparative Composition Example 1, and Comparative Composition Example 2 mentioned above was formed in a thickness of 0.5 mm by an atmospheric plasma spraying method so as to have a porous structure of a porosity of 10%. The atmospheric plasma spraying method was performed using a thermal spray gun manufactured by Sulzer Metco Ltd. (F4 Gun), with a thermal spraying powder synthesized by a powder mixing method from the raw materials respectively shown in Composition Example 1 to Composition Example 7, Comparative Composition Example 1, and Comparative Composition Example 2 mentioned above, under the conditions of a spray current of 600 (A), a spray distance of 150 (mm), a powder supply amount of 60 (g/min), and $Ar/H_2$ flow rates of 35/7.4 (l/min), to form layers having pores.

Regarding obtained test pieces of Example 9 to Example 14, Example 16, Comparative Example 3, and Comparative Example 4, the surface strain when vertical cracks were through was measured using a SEM-servo test machine having a scanning electron microscope (SEM) section and a means capable of stroke control of compression displacement at high temperatures, by the SEM-servo test described in Japanese Unexamined Patent Application, Publication No. 2004-12390. The results are shown in FIG. 11.

Figure 11:
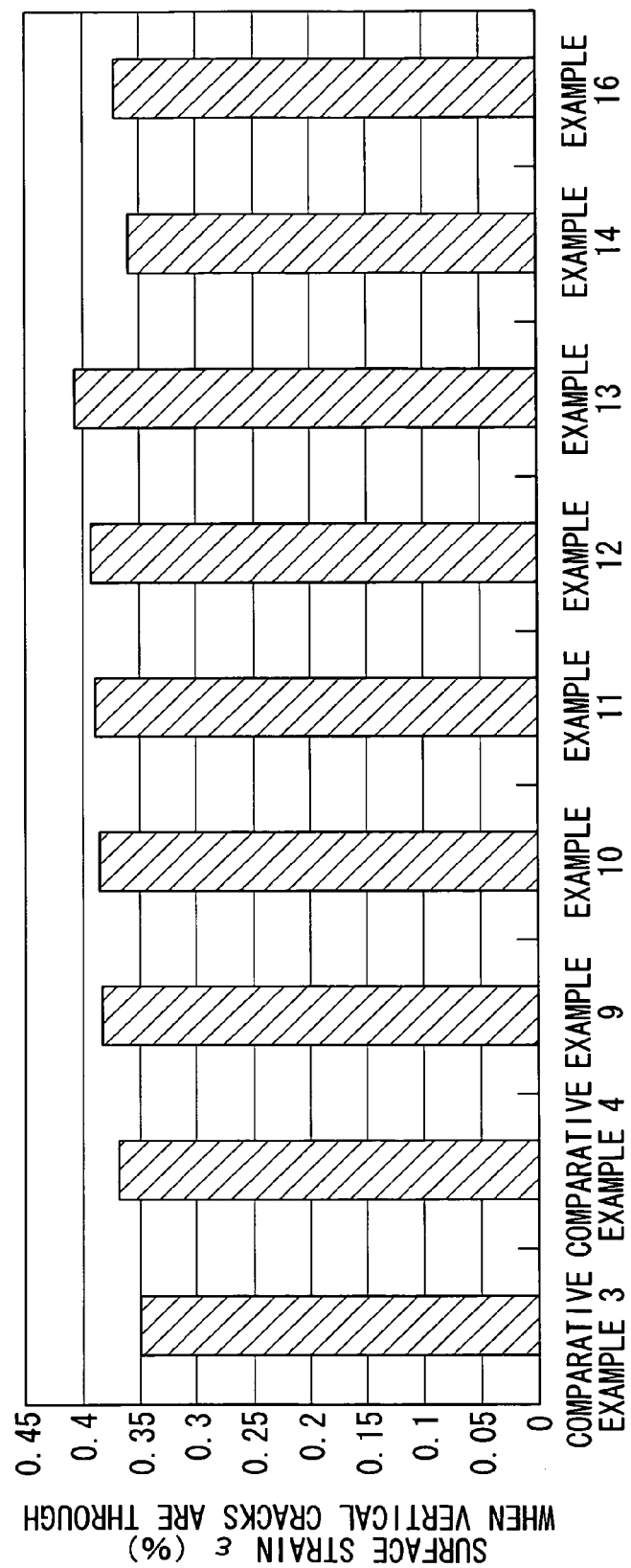
FIG. 11 is a graph showing the measurement results of the surface strain when vertical cracks are through top coat layers of Example 8 to Example 14, Comparative Example 3, and Comparative Example 4, by a SEM-servo test.

According to FIG. 11, it is found that the thermal barrier coating according to the present invention has a smaller surface strain when vertical cracks are through as compared to YSZ, and that the ductility of the substrate or the followability thereof in response to bending is equivalent to or higher than those with respect to YSZ.

Moreover, as to Example 13, Example 14, Example 16, and Comparative Example 3, the measurement of the thermal conductivity at 800° C. and the evaluation of the thermal cycle durability were carried out by the following methods.

Measurement of Thermal Conductivity

The thermal conductivity of each sample obtained from the above was measured. The thermal conductivity was measured by a laser flash method specified in JIS R1611.

Evaluation of Thermal Cycle Durability

Figure 12:
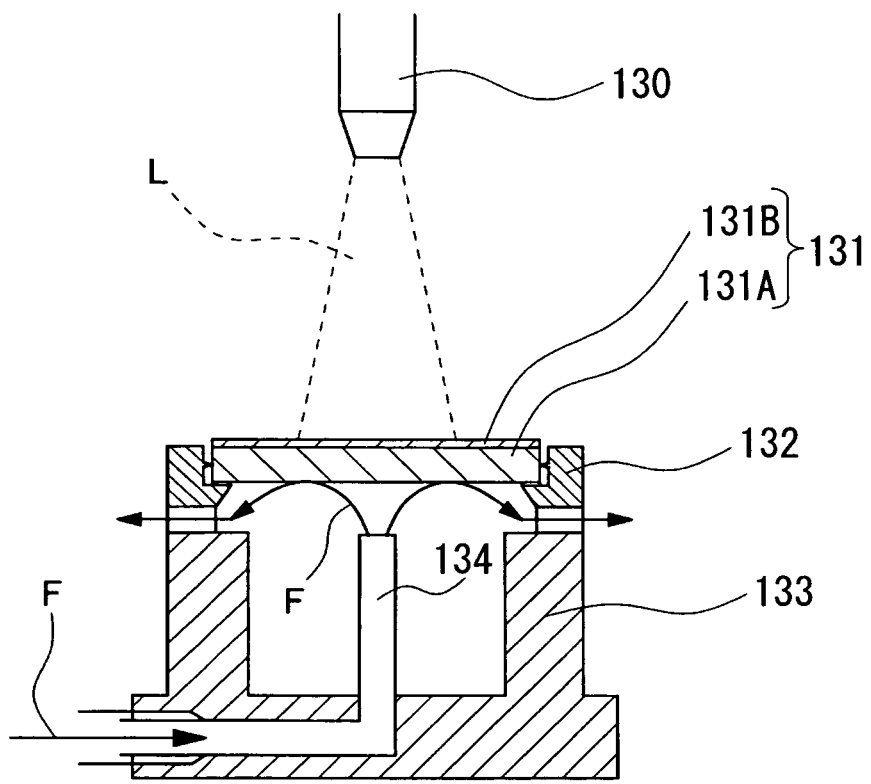
FIG. 12 is a schematic cross-sectional view of a laser-type thermal cycle tester used in Examples of the present invention.

FIG. 12 is a schematic cross-sectional view of a laser-type thermal cycle tester used for the evaluation of thermal cycle durability. The laser-type thermal cycle tester shown in this drawing is designed such that a sample 131 having a thermal barrier coating film 131B formed on a heat resistant substrate 131A is placed on a sample holder 132 that is arranged on a main body 133 so that the thermal barrier coating film 131B faces outside, and then the sample 131 is irradiated with laser beams L from a carbon dioxide gas laser apparatus 130 so as to heat the sample 131 from the side of the thermal barrier coating film 131B. Moreover, at the same time of heating by the laser apparatus 130, the sample 131 is cooled from the back side thereof by a gas flow F discharged from the tip of a cooling gas nozzle 134 which passes through the main body 133 and is arranged in the location facing the back side of the sample 131 in the main body 133.

Figure 13A:
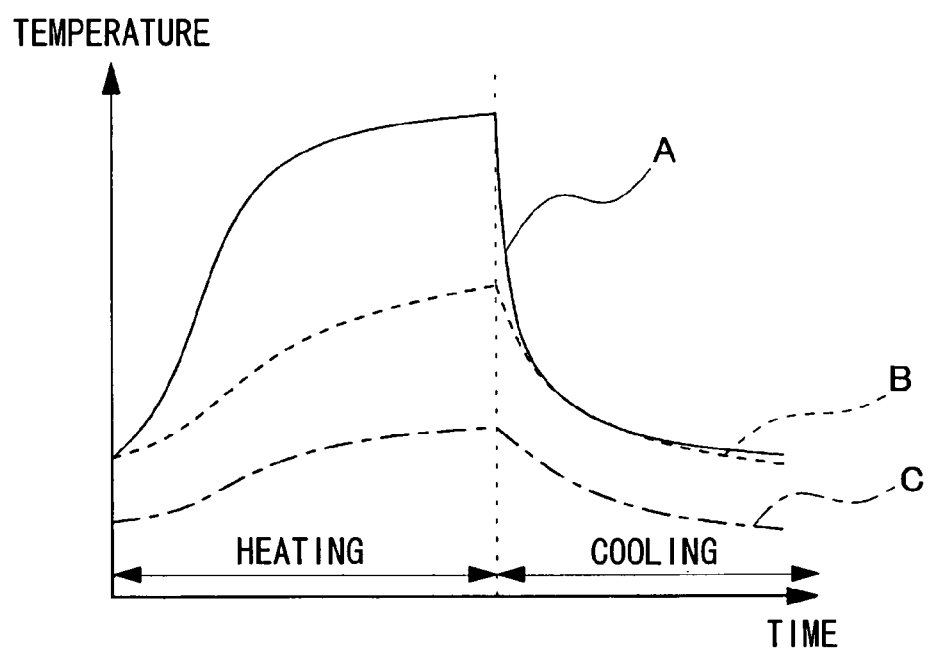
FIG. 13A is a graph showing the temperature history of a sample in the thermal cycle test using the laser thermal cycle tester shown in FIG. 12.
Figure 13B:
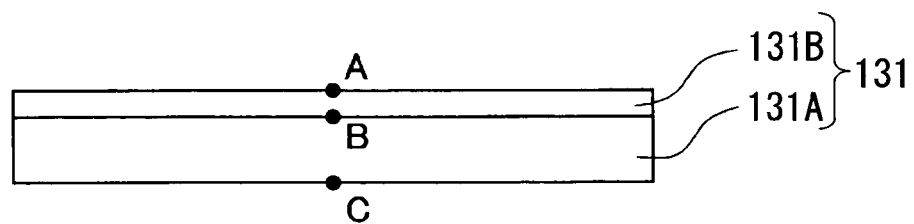
FIG. 13B is an explanatory diagram showing measuring points on the sample corresponding to each curve of FIG. 13A.

According to this laser-type thermal cycle tester, a temperature gradient can be readily formed in the sample 131, and the evaluation corresponding to the operating environment in cases where it is applied to a high-temperature part such as a gas-turbine member can be conducted. FIG. 13A is a graph schematically showing the temperature change of the sample subjected to the thermal cycle test using the apparatus shown in FIG. 12. The curves A to C shown in the graph respectively correspond to temperature measuring points A to C in the sample 131 shown in FIG. 13B. As shown in FIG. 13A and FIG. 13B, according to the apparatus shown in FIG. 12, the sample 131 can be heated so that the temperature is lowered in sequence of the surface (A) of the thermal barrier coating film 131B of the sample 131, the boundary (B) between the thermal barrier coating film 131B and the heat resistant substrate 131A, and the back side (C) of the heat resistant substrate 131A.

Accordingly, for example, by setting the temperature of the surface of the thermal barrier coating film 131B as high as 1200° C. or higher, and setting the temperature of the boundary between the thermal barrier coating film 131B and the heat resistant substrate 131A at 800 to 1000° C., temperature conditions similar to those of actual gas turbines can be obtained. Regarding the heating temperatures and temperature gradients set by the concerned tester, desired temperature conditions can be readily obtained by adjusting the output of the laser apparatus 130 and the gas flow F.

In the present examples, using the laser-type thermal cycle tester shown in FIG. 12, repeated heating was performed between a maximum surface temperature (the maximum temperature of the surface of the thermal barrier coating film) of 1500° C. and a maximum boundary temperature (the maximum temperature of the boundary between the thermal barrier coating film and the heat resistant substrate) of 1000° C. At that time, 3 minutes of heating time and 3 minutes of cooling time were repeated (the surface temperature in cooling was set to be 100° C. or below). In the thermal cycle test, the number of cycles at the time when the spalling of the thermal barrier coating film occurred was used as the evaluation value of the thermal cycle durability.

Table 2 shows thermal conductivities and thermal cycle durabilities of test pieces of Example 13, Example 14, Example 16, and Comparative Example 3.

TABLE 2

|  | Comparative Example 3 | Example 13 | Example 14 | Example 16 |
|---|---|---|---|---|
| Thermal conductivity at 800° C. (W/mK) | 0.74 to 1.4 | 0.26 to 0.65 | 0.28 to 0.70 | 0.28 to 0.72 |
| Thermal cycle durability | 10 to 100 cycles | 25 to 125 cycles | 20 to 120 cycles | 20 to 120 cycles |

Example 17 to Example 19

Ceramic layers (top coat layers) respectively having the composition of Composition Example 5, Composition Example 6, and Composition Example 8 mentioned above were formed by the following methods to produce samples of Example 17 to Example 19.

A bond coat layer was formed on the heat resistant substrate using the same raw materials and the same manner as those of Example 9 to Example 16, Comparative Example 3, and Comparative Example 4.

On this bond coat layer, a zirconia-containing layer (YSZ) was formed in a thickness of 0.25 mm by an atmospheric plasma spraying method so as to have a porous structure of a porosity of 10%. The atmospheric plasma spraying method was performed using a thermal spray gun manufactured by Sulzer Metco Ltd. (F4 Gun), with a thermal spraying powder of 204NS-G manufactured by Sulzer Metco Ltd., under the conditions of a spray current of 600 (A), a spray distance of 150 (mm), a powder supply amount of 60 (g/min), and Ar/$H_2$ flow rates of 35/7.4 (l/min), to form layers having pores.

On this zirconia-containing layer, a ceramic layer (top coat layer) respectively having the composition of Composition Example 5, Composition Example 6, and Composition Example 8 mentioned above was formed by the same manner as that of Example 9 to Example 16, Comparative Example 3, and Comparative Example 4. However, the thickness of the ceramic layer (top coat layer) was set to 0.25 mm.

Regarding the respective test pieces of Example 17 to Example 19, the measurement of the thermal conductivity at 800° C. and the evaluation of the thermal cycle durability were carried out by the same manners as those of Example 13, Example 14, Example 16, and Comparative Example 3 mentioned above. Table 3 shows thermal conductivities and thermal cycle durabilities of respective test pieces.

TABLE 3

|  | Example 17 | Example 18 | Example 19 |
|---|---|---|---|
| Thermal conductivity at 800° C. (W/mK) | 0.50 to 1.03 | 0.51 to 1.05 | 0.51 to 1.06 |
| Thermal cycle durability | 25 to 125 cycles | 20 to 120 cycles | 20 to 120 cycles |

Example 20 to Example 22

Ceramic layers (top coat layers) respectively having the composition of Composition Example 5, Composition Example 6, and Composition Example 8 mentioned above were formed by the following methods to produce samples of Example 20 to Example 22.

A bond coat layer was formed on the heat resistant substrate using the same raw materials and the same manner as those of Example 9 to Example 16, Comparative Example 3, and Comparative Example 4.

On this bond coat layer, a zirconia-containing layer was formed in a thickness of 0.25 mm by an atmospheric plasma spraying method so as to have a vertical crack structure (interval between vertical cracks: about 150 μm). The atmospheric plasma spraying method was performed using a thermal spray gun manufactured by Sulzer Metco Ltd. (F4 Gun), with a thermal spraying powder of 204NS-G manufactured by Sulzer Metco Ltd. (in the case where the zirconia-containing layer is YSZ serving as an example thereof) under the conditions of a powder supply amount of 60 (g/min) and Ar/$H_2$ flow rates of 35/7.4 (l/min), so as to form vertical cracks. The vertical cracks were introduced by shortening the spray distance (distance between the thermal spray gun and the heat resistant substrate) to 100 mm from 150 mm which is a spray distance conventionally used in the formation of a zirconia-containing layer; alternatively, by using the spray distance substantially same as that of conventional methods, but elevating the thermal spray gun current from 600 A to 650 A.

On this zirconia-containing layer, a ceramic layer (top coat layer) respectively having the composition of Composition Example 5, Composition Example 6, and Composition Example 8 mentioned above was formed by the same manner as that of Example 9 to Example 16, Comparative Example 3, and Comparative Example 4. However, the thickness of the ceramic layer (top coat layer) was set to 0.25 mm.

Regarding the respective test pieces of Example 20 to Example 22, the measurement of the thermal conductivity at 800° C. and the evaluation of the thermal cycle durability were carried out by the same manners as those of Example 13, Example 14, Example 16, and Comparative Example 3 mentioned above. Table 4 shows thermal conductivities and thermal cycle durabilities of respective test pieces.

TABLE 4

|  | Example 20 | Example 21 | Example 22 |
|---|---|---|---|
| Thermal conductivity at 800° C. (W/mK) | 1.02 to 1.34 | 1.03 to 1.36 | 1.03 to 1.37 |
| Thermal cycle durability | 45 to 155 cycles | 40 to 150 cycles | 40 to 150 cycles |

Example 23 to Example 25 and Comparative Example 5

Ceramic layers (top coat layers) respectively having the composition of Composition Example 5, Composition Example 6, Composition Example 8, and Comparative Composition Example 1 mentioned above were formed by the following methods to produce samples of Example 23 to Example 25 and Comparative Example 5.

A bond coat layer was formed on the heat resistant substrate using the same raw materials and the same manner as those of Example 9 to Example 16, Comparative Example 3, and Comparative Example 4.

On this bond coat layer, a ceramic layer (top coat layer) respectively having the composition of Composition Example 5, Composition Example 6, Composition Example 8, and Comparative Composition Example 1 mentioned above was formed in a thickness of 0.5 mm by an atmospheric plasma spraying method so as to have a vertical crack structure (interval between vertical cracks: about 150 μm). The atmospheric plasma spraying method was performed using a thermal spray gun manufactured by Sulzer Metco Ltd. (F4 Gun), with a thermal spraying powder synthesized by a powder mixing method from the raw materials respectively shown in Composition Example 5, Composition Example 6, Composition Example 8, and Comparative Composition Example 1 mentioned above, under the conditions of a powder supply amount of 60 (g/min) and Ar/$H_2$ flow rates of 35/7.4 (l/min), so as to form vertical cracks. The vertical cracks were introduced by shortening the spray distance (distance between the thermal spray gun and the heat resistant substrate) to 100 mm from 150 mm which is a spray distance conventionally used in the formation of a zirconia-containing layer; alternatively, by using the spray distance substantially same as that of conventional methods, but elevating the thermal spray gun current from 600 A to 650 A.

Regarding the respective test pieces of Example 23 to Example 25, and Comparative Example 5, the measurement of the thermal conductivity at 800° C. and the evaluation of the thermal cycle durability were carried out by the same manners as those of Example 13, Example 14, Example 16, and Comparative Example 3 mentioned above. Table 5 shows thermal conductivities and thermal cycle durabilities of respective test pieces.

TABLE 5

|  | Comparative Example 5 | Example 23 | Example 24 | Example 25 |
| --- | --- | --- | --- | --- |
| Thermal conductivity at 800° C. (W/mK) | 1.78 to 2.02 | 0.73 to 0.83 | 0.76 to 0.96 | 0.78 to 0.96 |
| Thermal cycle durability | 50 to 150 cycles | 70 to 180 cycles | 70 to 180 cycles | 70 to 180 cycles |

Example 26 to Example 28

Ceramic layers (top coat layers) respectively having the composition of Composition Example 5, Composition Example 6, and Composition Example 8 mentioned above were formed by the following methods to produce samples of Example 26 to Example 28.

A bond coat layer was formed on the heat resistant substrate using the same raw materials and the same manner as those of Example 9 to Example 16, Comparative Example 3, and Comparative Example 4.

On this bond coat layer, a zirconia-containing layer having a vertical crack structure was formed using the same raw materials and the same manner as those of Example 20 to Example 22 mentioned above.

On this zirconia-containing layer, a ceramic layer (top coat layer) having a vertical crack structure was formed using the same raw materials and the same manner as those of Example 23 to Example 25 mentioned above.

Regarding the respective test pieces of Example 26 to Example 28, the measurement of the thermal conductivity at 800° C. and the evaluation of the thermal cycle durability were carried out by the same manners as those of Example 13, Example 14, Example 16, and Comparative Example 3 mentioned above. Table 6 shows thermal conductivities and thermal cycle durabilities of respective test pieces.

TABLE 6

|  | Example 26 | Example 27 | Example 28 |
| --- | --- | --- | --- |
| Thermal conductivity at 800° C. (W/mK) | 1.26 to 1.43 | 1.27 to 1.49 | 1.28 to 1.49 |
| Thermal cycle durability | 70 to 180 cycles | 70 to 180 cycles | 70 to 180 cycles |

Example 29 to Example 31, and Comparative Example 6

Ceramic layers (top coat layers) respectively having the composition of Composition Example 5, Composition Example 6, Composition Example 8, and Comparative Composition Example 1 mentioned above were formed by the following methods to produce samples of Example 29 to Example 31 and Comparative Example 6.

A bond coat layer was formed on the heat resistant substrate using the same raw materials and the same manner as those of Example 9 to Example 16, Comparative Example 3, and Comparative Example 4.

On this bond coat layer, a ceramic layer (top coat layer) was formed in a thickness of 0.5 mm by an electron-beam physical vapor deposition method (EB-PVD) using a sintered ingot composed of the raw materials respectively described in Composition Example 5, Composition Example 6, Composition Example 8, and Comparative Composition Example 1 mentioned above, as a target material. The electron-beam physical vapor deposition method was performed using an electron-beam vapor deposition apparatus manufactured by Ardennes (such as TUBA150) with the abovementioned sintered ingot as a target material under the conditions of an electron-beam output of 50 kW, a reduced-pressure environment at an atmosphere of $10^{-4}$ torr, and a temperature of the heat resistant substrate at 1,000° C.

Regarding the respective test pieces of Example 29 to Example 31, and Comparative Example 6, the measurement of the thermal conductivity at 800° C. and the evaluation of the thermal cycle durability were carried out by the same manners as those of Example 13, Example 14, Example 16, and Comparative Example 3 mentioned above. Table 7 shows thermal conductivities and thermal cycle durabilities of respective test pieces.

TABLE 7

|  | Comparative Example 6 | Example 29 | Example 30 | Example 31 |
| --- | --- | --- | --- | --- |
| Thermal conductivity at 800° C. (W/mK) | 1.65 to 1.9 | 0.73 to 0.83 | 0.76 to 0.96 | 0.78 to 0.96 |
| Thermal cycle durability | 50 to 150 cycles | 70 to 180 cycles | 70 to 180 cycles | 70 to 180 cycles |

In respective Examples mentioned above, Composition Example 1 to Composition Example 5 were used as the composition corresponding to the "CaO/MgO-doped $A_2Zr_2O_7$" of the present invention, Composition Example 6 and Composition Example 7 were used as the composition corresponding to the "$A'_1B_1Zr_2O_7$" of the present invention, and Composition Example 8 was used as the composition corresponding to the "$A''_2Ce_2O_7$" of the present invention. However, the composition employed in the present invention is not limited to these Composition Examples. Those in which an element corresponding to the element A, A', A'', or B in the respective Examples mentioned above has been replaced with another element within the scope of the respective claims of the present application can also provide substantially same effects as those of the respective Examples mentioned above.

The invention claimed is:

1. A thermal barrier coating member comprising
a heat resistant substrate,
a bond coat layer formed on the heat resistant substrate, and
a ceramic layer formed on the bond coat layer,
wherein the ceramic layer comprises an oxide represented by general formula $A'_1B_1Zr_2O_7$, where A' and B each represent any of Sm, Ce, and Yb, and A' and B are mutually different elements,
wherein the oxide has a pyrochlore type crystal structure to lower thermal conductivity,
wherein said ceramic layer has pores with a porosity of not lower than 1% and not higher than 30%, and
wherein said ceramic layer has vertical cracks in a thickness direction thereof at intervals of not smaller than 5% and not larger than 100% of a total thickness of layer(s) other than the bond coat layer on the heat resistant substrate.

2. A thermal barrier coating member comprising
a heat resistant substrate,
a bond coat layer formed on the heat resistant substrate, and
a ceramic layer formed on the bond coat layer,
wherein the ceramic layer comprises an oxide represented by general formula $A'_1B_1Zr_2O_7$, where A' and B each represent any of Sm, Ce, and Yb, and A' and B are mutually different elements,
wherein the ceramic layer has pores with a porosity of not lower than 1% and not higher than 30%,
wherein the oxide has a pyrochlore type crystal structure to lower thermal conductivity, and
wherein said ceramic layer is of columnar crystals.

3. A thermal barrier coating member according to claim 1 or claim 2, further comprising a zirconia-containing layer between the bond coat layer and the ceramic layer.

4. A thermal barrier coating member according to claim 3, wherein said zirconia-containing layer has pores at a porosity of not lower than 1% and not higher than 30%.

5. A thermal barrier coating member according to claim 3, wherein said zirconia-containing layer has vertical cracks in a thickness direction thereof at intervals of not smaller than 5% and not larger than 100% of a total thickness of layer(s) other than the bond coat layer on the heat resistant substrate.

6. A gas turbine comprising the thermal barrier coating member according to claim 1 or claim 2.

7. A method for producing a thermal barrier coating member according to claim 1 or 2, comprising:
forming a bond coat layer on a heat resistant substrate; and
forming a ceramic layer comprising an oxide represented by the general formula $A'_1B_1Zr_2O_7$, where A' and B each represent any of Sm, Ce, and Yb, and A' and B are mutually different elements, on the bond coat layer,
wherein the oxide has a pyrochlore type crystal structure, and
wherein the forming a ceramic layer includes a stage of introducing pores into said ceramic layer and a stage of introducing vertical cracks into said ceramic layer in a thickness direction.

8. A method for producing a thermal barrier coating member according to claim 7, wherein the thermal barrier coating material is to be thermal-sprayed or deposed on a heat resistant substrate and the heat resistant substrate is a substrate to be used for parts of gas turbines.

* * * * *